United States Patent
Byun

(10) Patent No.: US 12,203,821 B2
(45) Date of Patent: Jan. 21, 2025

(54) SENSING DEVICE

(71) Applicant: LG INNOTEK CO., LTD., Seoul (KR)

(72) Inventor: Sung Wook Byun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/437,776

(22) Filed: Feb. 9, 2024

(65) Prior Publication Data

US 2024/0183730 A1    Jun. 6, 2024

Related U.S. Application Data

(63) Continuation of application No. 17/593,173, filed as application No. PCT/KR2020/003437 on Mar. 12, 2020, now Pat. No. 11,953,394.

(30) Foreign Application Priority Data

Mar. 12, 2019    (KR) .................. 10-2019-0028084

(51) Int. Cl.
G01L 3/10          (2006.01)
B62D 15/02         (2006.01)

(52) U.S. Cl.
CPC ............ G01L 3/104 (2013.01); *B62D 15/021* (2013.01)

(58) Field of Classification Search
CPC ...... B62D 6/10; B60Y 2400/307; G01L 3/104
See application file for complete search history.

(56) References Cited

U.S. PATENT DOCUMENTS

| 4,972,109 | A | 11/1990 | Kakizaki et al. |
| 10,330,542 | B1 | 6/2019 | Pearce |
| 11,525,747 | B2 | 12/2022 | Byun |
| 11,585,707 | B2 | 2/2023 | Lee et al. |
| 11,719,587 | B2 | 8/2023 | Yang |
| 11,953,394 | B2 * | 4/2024 | Byun ................. G01D 5/145 |

(Continued)

FOREIGN PATENT DOCUMENTS

| CN | 104039632 A | 9/2014 |
| DE | 101 08 883 A1 | 10/2001 |

(Continued)

OTHER PUBLICATIONS

International Search Report dated Jun. 19, 2020 in International Application No. PCT/KR2020/003437.

(Continued)

*Primary Examiner* — Octavia Hollington
(74) *Attorney, Agent, or Firm* — Saliwanchik, Lloyd & Eisenschenk

(57) ABSTRACT

An embodiment may provide a sensing device comprising: a stator comprising stator teeth; and a rotor comprising magnets, wherein: the stator teeth comprise a first stator tooth and a second stator tooth arranged to overlap the first stator tooth in the radial direction from the center of the stator; the first stator tooth comprises multiple first teeth and multiple third teeth, and the second stator tooth comprises multiple second teeth; one of the multiple first teeth is arranged to overlap one of the multiple second teeth in the radial direction; and the magnets are disposed between the multiple first teeth and the multiple third teeth, respectively.

10 Claims, 41 Drawing Sheets

(56) References Cited

U.S. PATENT DOCUMENTS

| | | |
|---|---|---|
| 12,062,951 B2 * | 8/2024 | Son .................. G01L 5/221 |
| 2005/0172727 A1 * | 8/2005 | Pattok ............... G01D 5/2451 |
| | | 73/799 |
| 2007/0157740 A1 | 7/2007 | Jerems et al. |
| 2010/0180696 A1 | 7/2010 | Islam et al. |
| 2010/0319466 A1 * | 12/2010 | Bae .................. G01L 3/104 |
| | | 73/862.325 |
| 2021/0175760 A1 | 6/2021 | Woo et al. |
| 2022/0214236 A1 | 7/2022 | Byun |
| 2022/0297753 A1 | 9/2022 | Lee et al. |
| 2023/0030174 A1 | 2/2023 | Choi et al. |
| 2023/0033808 A1 | 2/2023 | Son et al. |
| 2023/0038153 A1 | 2/2023 | Woo et al. |

FOREIGN PATENT DOCUMENTS

| | | |
|---|---|---|
| DE | 10 2005 011 196 A1 | 9/2006 |
| EP | 3 940 358 B1 | 9/2023 |
| JP | 2009-522569 A | 6/2009 |
| JP | 2018-132509 A | 8/2018 |
| KR | 10-0976701 B1 | 8/2010 |
| KR | 10-2011-0139433 A | 12/2011 |
| KR | 10-2018-0119340 A | 11/2018 |
| KR | 10-2021-0089509 A | 7/2021 |
| WO | 2011/162500 A2 | 12/2011 |
| WO | 2018/199606 A1 | 11/2018 |
| WO | 2019/022325 A1 | 1/2019 |

OTHER PUBLICATIONS

Supplementary European Search Report dated Mar. 24, 2022 in European Application No. 20769457.1.
European Search Report dated Jan. 3, 2024 in European Application No. 23187151.8.
Notice of Allowance dated Nov. 8, 2023 in U.S. Appl. No. 17/593,173.
Office Action dated Mar. 26, 2024 in Japanese Application No. 2021-555044.

* cited by examiner

FIG. 17
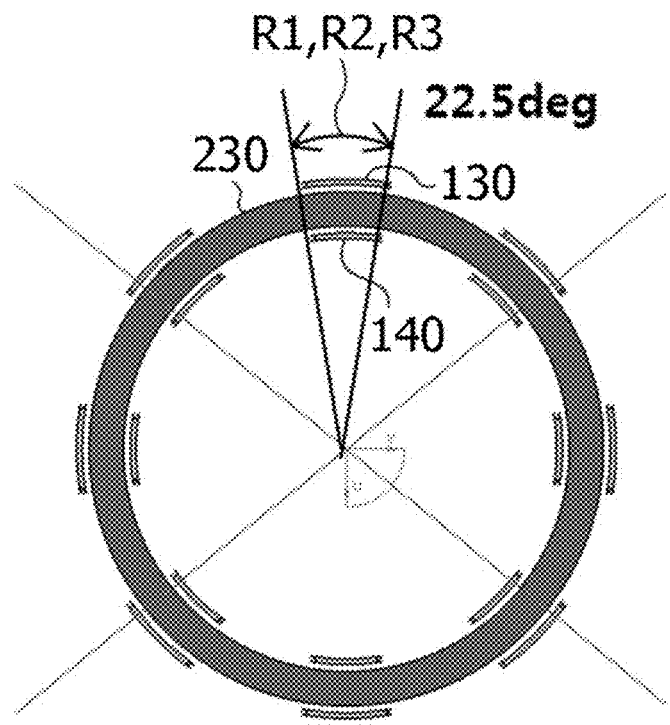
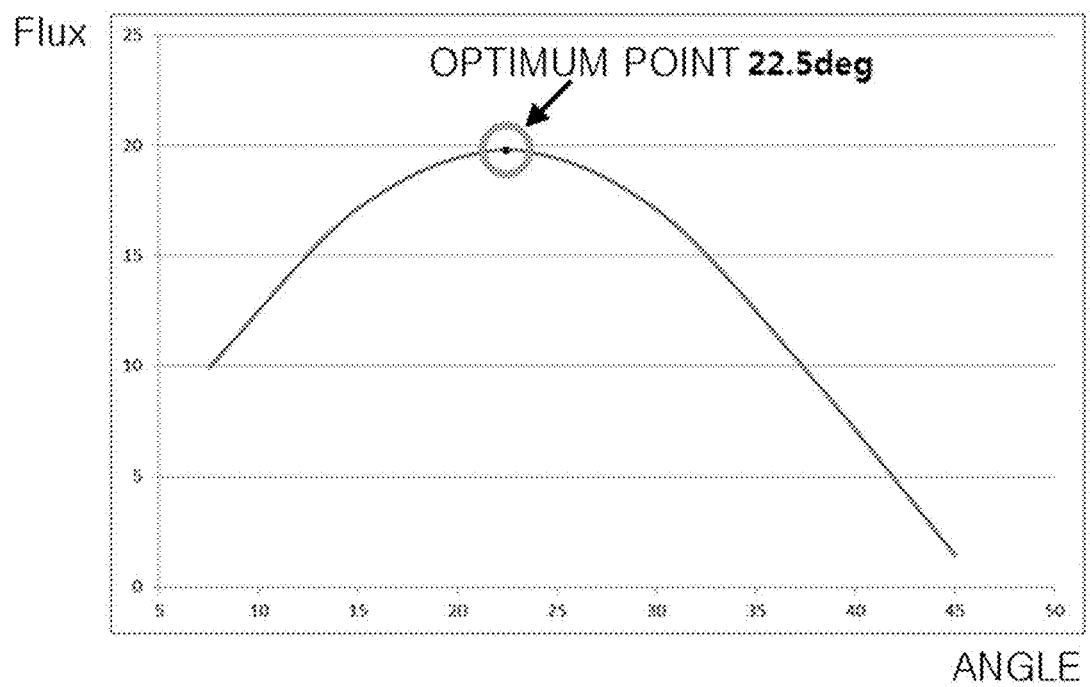

SENSING DEVICE

CROSS-REFERENCE TO RELATED APPLICATIONS

This application is a continuation of U.S. application Ser. No. 17/593,173, filed Sep. 10, 2021; which is the U.S. national stage application of International Patent Application No. PCT/KR2020/003437, filed Mar. 12, 2020, which claims the benefit under 35 U.S.C. § 119 of Korean Application No. 10-2019-0028084, filed Mar. 12, 2019, the disclosures of each of which are incorporated herein by reference in their entirety.

TECHNICAL FIELD

An embodiment relates to a sensing device.

BACKGROUND ART

An electronic power system (hereinafter, referred to as 'EPS') enables a driver to safely drive by driving a motor from an electronic control unit according to driving conditions to ensure turning stability and provide a quick restoring force.

The EPS includes a sensor assembly which measures a torque of a steering shaft, a steering angle, and the like to provide an appropriate torque. The sensor assembly can include a torque sensor which measures a torque applied to the steering shaft and an index sensor which measures angular acceleration of the steering shaft. Further, the steering shaft can include an input shaft connected to a handle, an output shaft connected to a power transmission configuration at a wheel side, and a torsion bar which connects the input shaft and the output shaft.

The torque sensor measures the torque applied to the steering shaft by measuring a degree of torsion of the torsion bar. Further, the index sensor senses rotation of the output shaft to measure the angular acceleration of the steering shaft. In the sensor assembly, the torque sensor and the index sensor can be disposed together and integrally configured.

The torque sensor may include a housing, a rotor, a stator including stator teeth, and a collector to measure the torque.

In this case, the torque sensor is a magnetic type structure, and can be provided as a structure in which the collector is disposed at an outer side of the stator teeth.

However, when an external magnetic field is generated, since the collector serves as a path of the external magnetic field in the structure, there is a problem of affecting a magnetic flux value of a Hall integrated circuit (IC). Accordingly, since a change occurs in an output value of the torque sensor, a problem in that the degree of torsion of the torsion bar cannot be accurately measured occurs.

Specifically, since the electronic equipment of a vehicle increases, and thus the torque sensor can be affected by the external magnetic field in many cases, a torque sensor which is not affected by the external magnetic field is being requested.

DISCLOSURE

Technical Problem

An embodiment is directed to providing a sensing device capable of avoiding magnetic field interference caused by an external magnetic field generated during torque measurement.

Specifically, an embodiment is directed to providing a sensing device capable of avoiding magnetic field interference caused by an external magnetic field introduced from a side surface of the sensing device.

An embodiment is directed to providing a sensing device which reduces the number of collectors and has a simplified structure.

An embodiment is directed to providing a sensing device capable of inhibiting an occurrence of magnetic field interference due to a flow of an external magnetic field into a collector.

Problems to be solved by the embodiment are not limited to the above-mentioned problems, and other problems which are not mentioned above may be apparently understood by those skilled in the art from below.

Technical Solution

One aspect of the present invention provides a sensing device including: a stator including stator teeth; and a rotor including a magnet, wherein the stator teeth include a first stator tooth and a second stator tooth disposed to overlap the first stator tooth in a radial direction from a center of the stator, the first stator tooth includes a plurality of first teeth and a plurality of third teeth, the second stator tooth includes a plurality of second teeth, one of the plurality of first teeth is disposed to overlap one of the plurality of second teeth in the radial direction, and the magnet is disposed between the plurality of first teeth and the plurality of third teeth.

Another aspect of the present invention provides a sensing device including: a stator; and a rotor including magnets, wherein the stator includes a first stator tooth and a second stator tooth, the first stator tooth includes a first body and a first tooth connected to the first body, an extending portion protruding inward from the first body, and a third tooth connected to the extending portion, the second stator tooth includes a second body and a second tooth connected to the second body, the first tooth and the second tooth overlap in a radial direction, the magnet is disposed between the first tooth and the second tooth, and the shortest distance from a center of the first stator tooth to the first tooth is larger than the shortest distance from the center of the first stator tooth to the third tooth.

Still another aspect of the present invention provides a sensing device including: a stator including stator teeth; and a rotor including a magnet, wherein the stator teeth include a first stator tooth and a second stator tooth, the first stator tooth includes a plurality of first teeth and a plurality of third teeth, the second stator tooth includes a plurality of second teeth, the magnet is disposed between the plurality of first teeth and the plurality of third teeth and disposed between the plurality of first teeth and the plurality of second teeth, a diameter formed by the plurality of third teeth is smaller than a diameter formed by the plurality of first teeth, and a diameter formed by the plurality of second teeth is smaller than the diameter formed by the plurality of first teeth.

Preferably, the stator may include a stator holder and a stator body coupled to the stator holder, and the first stator tooth and the second stator tooth may be disposed in the stator body.

Preferably, the stator body may include a first hole through which the first tooth passes, a second hole through which the second tooth passes, and a third hole through which the third tooth passes.

Preferably, the second tooth and the third tooth may be disposed on a virtual first circumference, and the first tooth may be disposed on a virtual second circumference different from the virtual first circumference.

Preferably, the first tooth, the second tooth, and the third tooth may be concentrically disposed.

Preferably, a width of a lower end of the third tooth in a circumferential direction may be smaller than a width of a lower end of the first tooth in the circumferential direction.

Preferably, a width of a lower end of the third tooth in the circumferential direction may be smaller than a width of a lower end of the second tooth in the circumferential direction.

Preferably, the third teeth and the second teeth are alternatively disposed along a circumferential direction of the stator.

Preferably, the first stator tooth may include a first body connected to the first tooth and an extending portion extending from the first body and connected to the third tooth.

Preferably, the first stator tooth may include a first body connected to the first tooth, the second stator tooth may include a second body connected to the second tooth, the sensing device may further include a sensor disposed between the first body and the second body, and the second body may include a protruding portion protruding toward the sensor.

Preferably, a collector may be disposed between the protruding portion and the sensor.

Preferably, the sensing device may further include a sensor disposed between the first body and the second body, and the second body may include a protruding portion protruding toward the sensor.

Preferably, the collector may be disposed between the protruding portion and the sensor.

Preferably, the first tooth, the second tooth, and the third tooth may each be a plurality.

Advantageous Effects

In a sensing device according to the embodiment having the configuration as described above, since a collector is disposed between a pair of stator teeth, and a sensor is disposed between the collectors, magnetic field interference caused by an external magnetic field generated from the outside during torque measurement can be inhibited or minimized.

Further, since a first tooth of a first stator tooth and a second tooth of a second stator tooth disposed to be spaced apart from each other in a radial direction are disposed to overlap each other, and a magnet between the first tooth and the second tooth is rotated, the first tooth and the second tooth can be charged with different polarities.

In addition, there is an advantage of increasing a size of flux to be collected.

In addition, it is possible to inhibit or minimize magnetic field interference caused by an external magnetic field introduced from an inner side of a stator holder.

In addition, it is possible to inhibit or minimize magnetic field interference caused by an external magnetic field introduced from a side surface of the sensing device.

Various useful advantages and effects of the embodiment are not limited to the above and can be relatively easily understood in a process of describing exemplary embodiments of the embodiment.

DESCRIPTION OF DRAWINGS

FIG. 17 is a graph illustrating flux versus a first angle, the second angle, and the third angle.

MODES OF THE INVENTION

Figure 1:
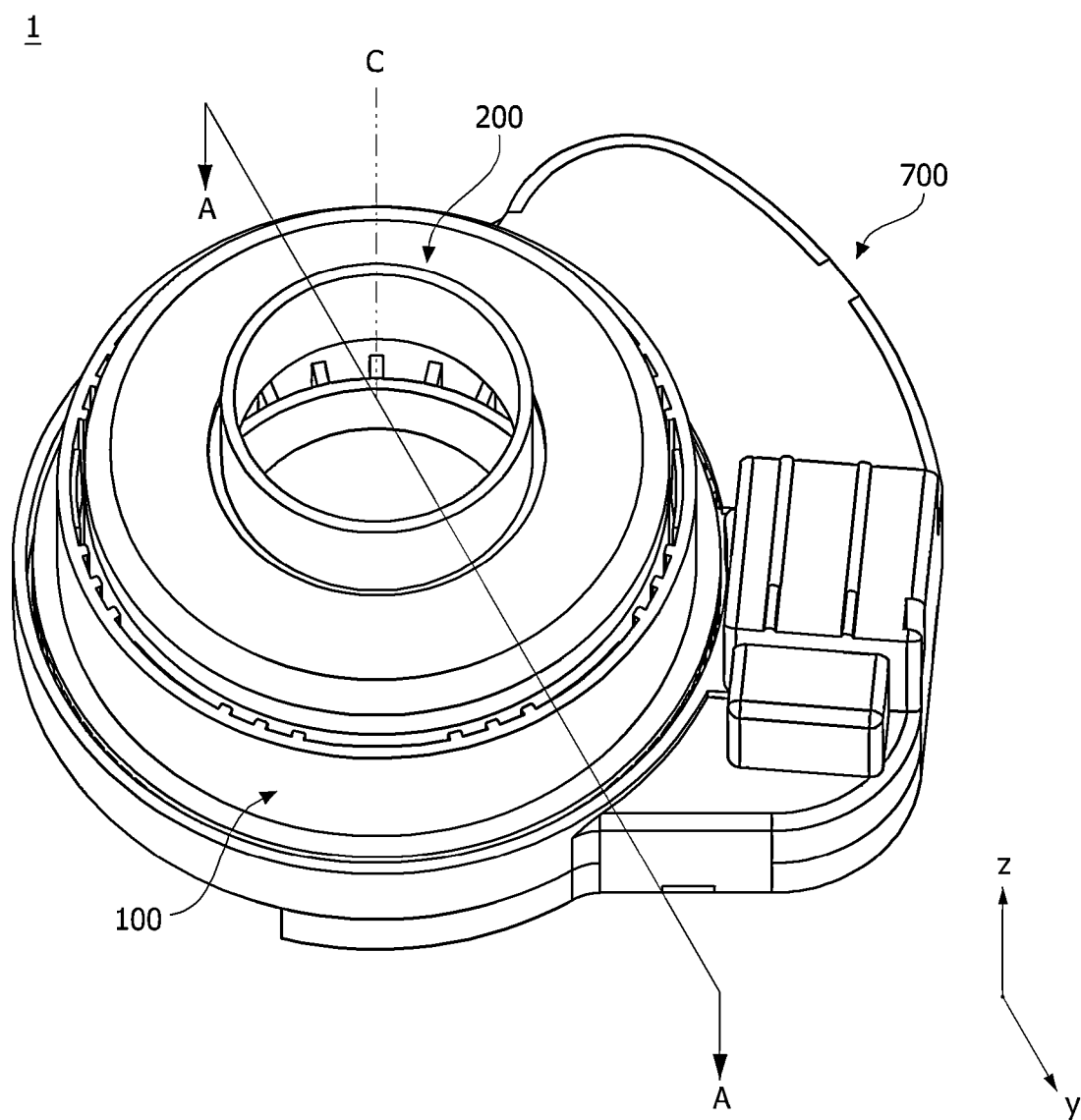
FIG. 1 is a perspective view illustrating a sensing device according to an embodiment.

Hereinafter, preferred embodiments of the present invention will be described in detail with reference to the accompanying drawings.

However, the technical spirit of the present invention is not limited to some embodiments which will be described and may be embodied in various forms, and one or more elements in the embodiments may be selectively combined and replaced to be used within the scope of the technical spirit of the present invention.

Further, terms used in the embodiments of the present invention (including technical and scientific terms), may be interpreted with meanings that are generally understood by those skilled in the art unless particularly defined and described, and terms which are generally used, such as terms defined in a dictionary, may be understood in consideration of their contextual meanings in the related art.

In addition, terms used in the description are provided not to limit the present invention but to describe the embodiments.

In the specification, the singular form may also include the plural form unless the context clearly indicates otherwise and may include one or more of all possible combinations of A, B, and C when disclosed as "at least one (or one or more) of A, B, and C".

Further, terms such as first, second, A, B, (a), (b), and the like may be used to describe elements of the embodiments of the present invention.

The terms are only provided to distinguish the elements from other elements, and the essence, sequence, order, or the like of the elements are not limited by the terms.

Further, when particular elements are disclosed as being "connected," "coupled," or "linked" to other elements, this may not only include a case of elements being directly connected, coupled, or linked to other elements but also a case of elements being connected, coupled, or linked to other elements by still other elements between the elements and other elements.

In addition, when one element is disclosed as being formed "on or under" another element, the term "on or under" includes both a case in which the two elements are in direct contact with each other and a case in which at least another element is disposed between the two elements (indirectly). Further, when the term "on or under" is expressed, a meaning of not only an upward direction but also a downward direction may be included based on one element.

Hereinafter, the embodiment will be described in detail with reference to the accompanying drawings, and the same or corresponding components have the same reference numerals regardless of reference numerals, and overlapping descriptions thereof will be omitted.

Figure 2:
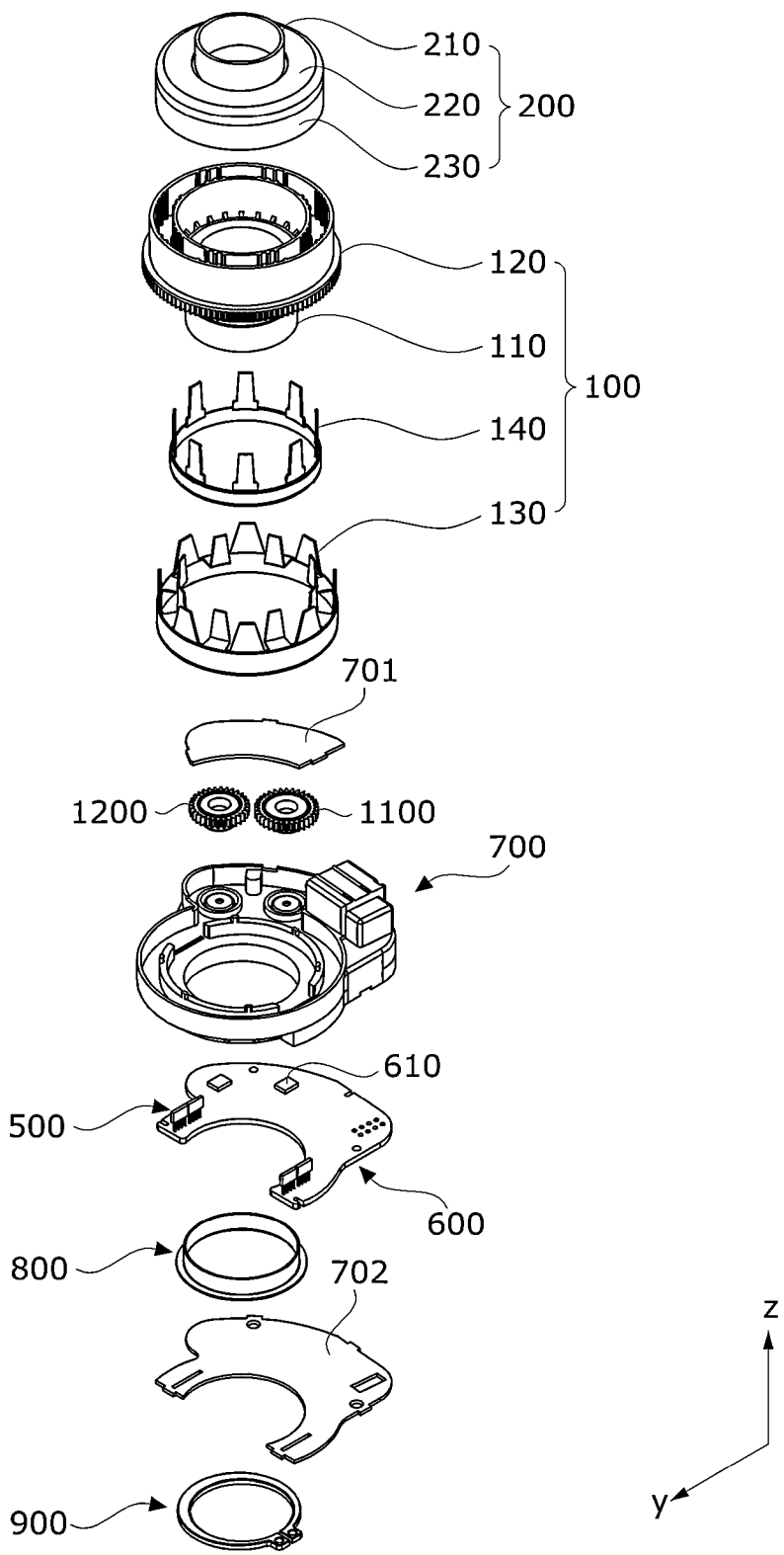
FIG. 2 is an exploded perspective view illustrating the sensing device shown in FIG. 1.
Figure 3:
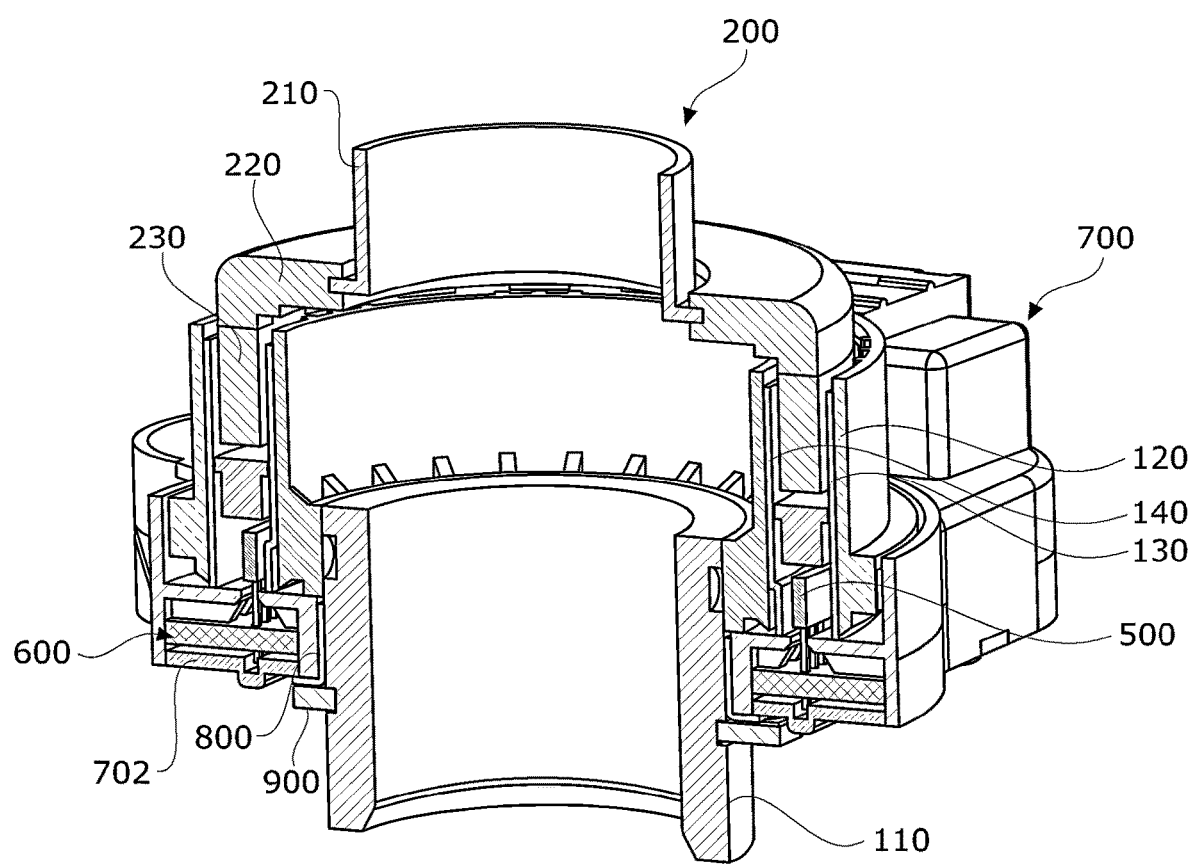
FIG. 3 is a cross-sectional perspective view of the sensing device taken along line A-A in FIG. 1.

FIG. 1 is a perspective view illustrating a sensing device according to an embodiment, FIG. 2 is an exploded perspective view illustrating the sensing device shown in FIG. 1, and FIG. 3 is a cross-sectional perspective view of the sensing device taken along line A-A in FIG. 1. In FIGS. 1 and 2, a z-direction indicates an axial direction, and a y-direction indicates a radial direction. Further, the axial direction and the radial direction are perpendicular to each other.

Referring to FIGS. 1 to 3, a sensing device 1 according to the embodiment may include a stator 100, a rotor 200 partially disposed in the stator 100, a sensor 500, a circuit board 600 electrically connected to the sensor 500, a housing 700 to which the circuit board 600 is coupled, a first member 800, and a second member 900.

Here, the stator 100 may be connected to an output shaft (not shown), and the rotor 200 at least partially and rotatably disposed in the stator 100 may be connected to an input shaft (not shown), but the embodiment is not necessarily limited thereto.

In this case, the rotor 200 may be rotatably disposed with respect to the stator 100. Hereinafter, an inner side may indicate a direction disposed toward a center C in the radial direction, and an outer side may indicate a direction opposite to the inner side.

Figure 4:
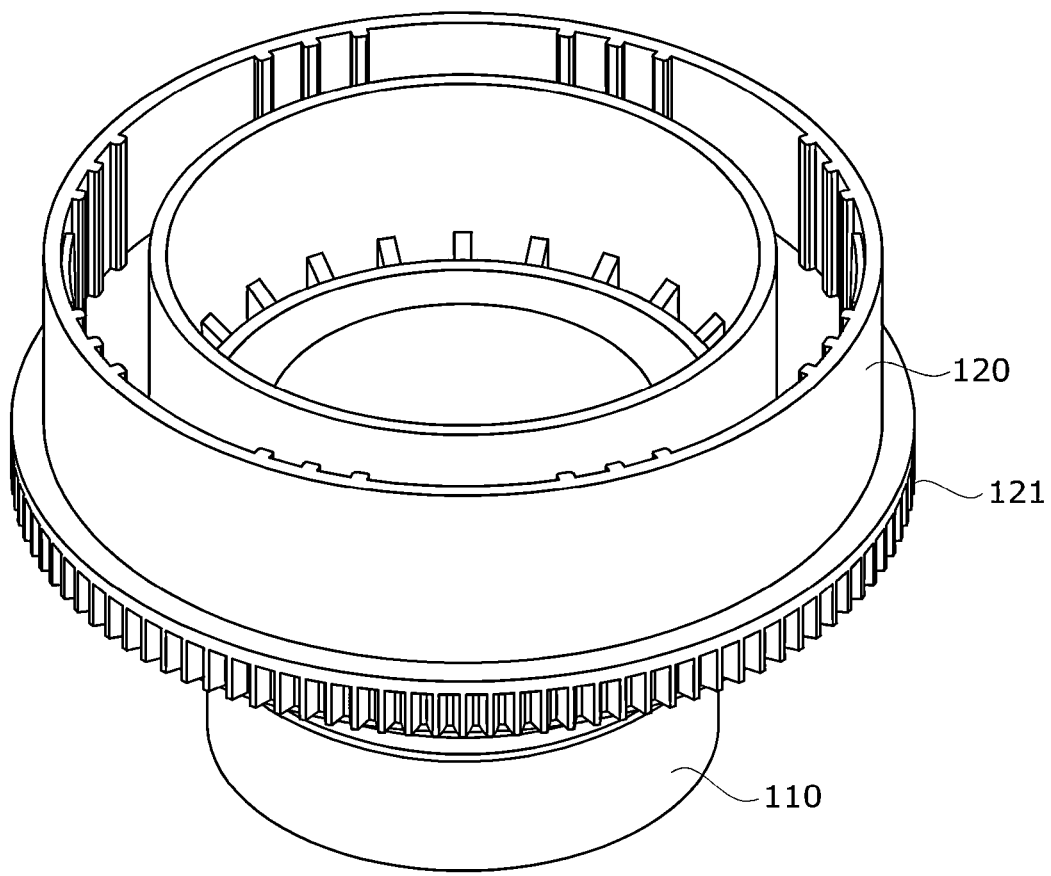
FIG. 4 is a perspective view illustrating a stator of the sensing device according to the embodiment.
Figure 5:
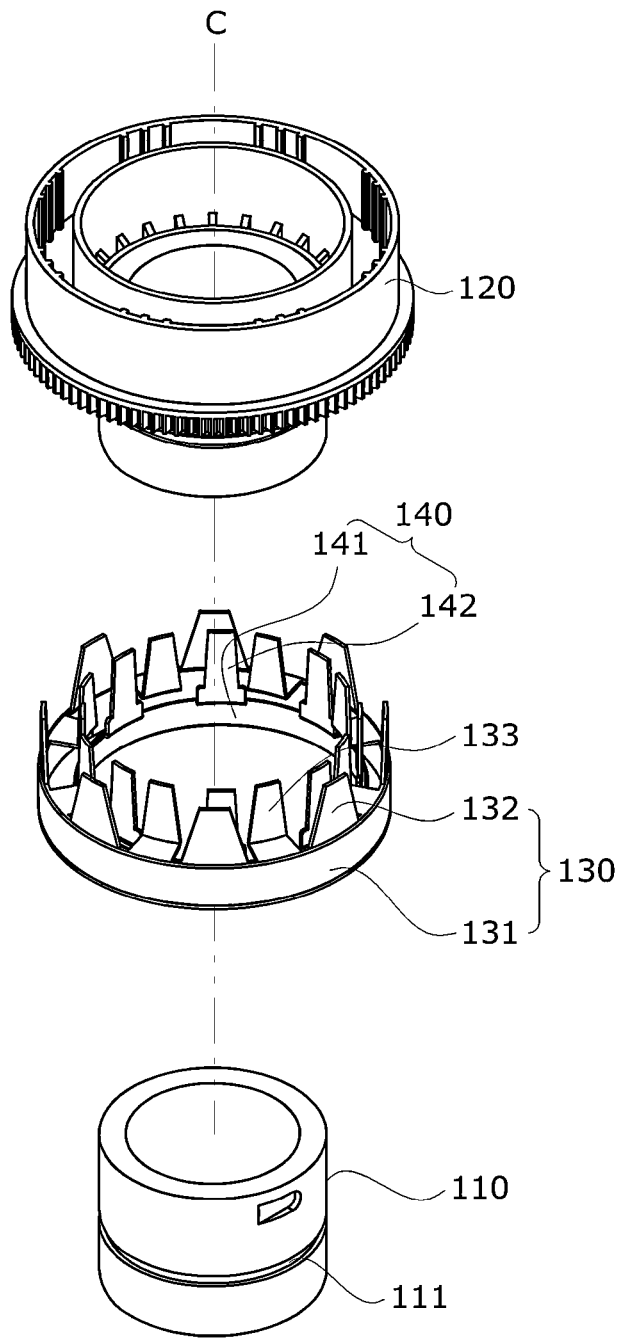
FIG. 5 is an exploded perspective view illustrating the stator of the sensing device according to the embodiment.
Figure 6:
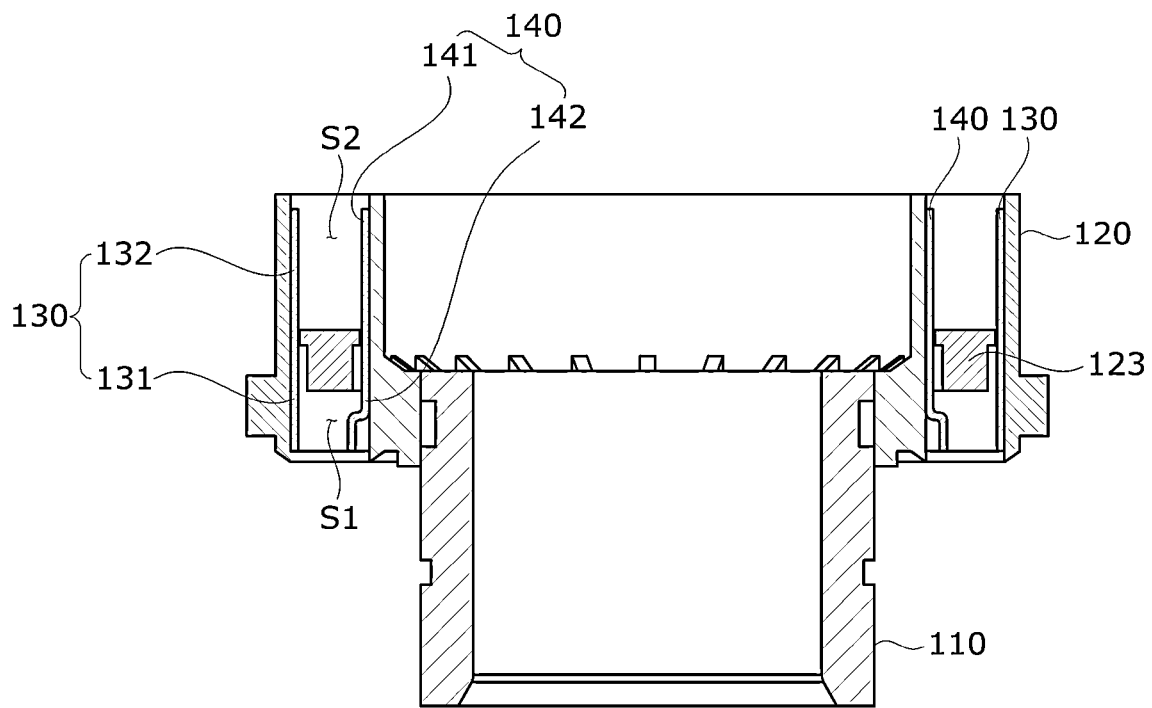
FIG. 6 is a cross-sectional view illustrating the stator of the sensing device according to the embodiment.

FIG. 4 is a perspective view illustrating the stator of the sensing device according to the embodiment, FIG. 5 is an exploded perspective view illustrating the stator of the sensing device according to the embodiment, and FIG. 6 is a cross-sectional view illustrating the stator of the sensing device according to the embodiment.

The stator 100 may be connected to the output shaft (not shown) of a steering shaft.

Referring to FIGS. 4 to 6, the stator 100 may include a stator holder 110, a stator body 120, a first stator tooth 130, and a second stator tooth 140.

The stator holder 110 may be connected to an output shaft of an electric steering device. Accordingly, the stator holder 110 may rotate in conjunction with rotation of the output shaft. The stator holder 110 may be formed in a cylindrical shape. Further, the stator holder 110 may be formed of a metal material, but is not necessarily limited thereto, and the stator holder 110 may be formed of a different material in consideration of strength greater than or equal to a predetermined level so that the output shaft may be fitted and fixed thereto.

The stator holder 110 may include a groove 111. The groove 111 is concavely formed on an outer circumferential surface of the stator holder 110. The groove 111 is disposed along the outer circumferential surface of the stator holder 110. A fixing member (900 in FIG. 2) is inserted into the groove 111.

The stator holder 110 may be coupled to the stator body 120.

The stator body 120 may be disposed at one end portion of the stator holder 110. The stator body 120 may be coupled to the stator holder 110 by an insert injection method using a synthetic resin such as resin. A main gear 121a may be formed on an outer circumferential surface of the stator body 120. The main gear 121a transmits a rotational force of the stator body 120 to a first gear 1100 and a second gear 1200.

The first stator tooth 130 and the second stator tooth 140 may be disposed to be spaced apart from each other in the radial direction. Further, the first stator tooth 130 and the second stator tooth 140 may be fixed to the stator body 120. The first stator tooth 130 includes a first body 131, first teeth 132, and third teeth 133. The second stator tooth 140 includes a second body 141 and second teeth 142.

Figure 7:
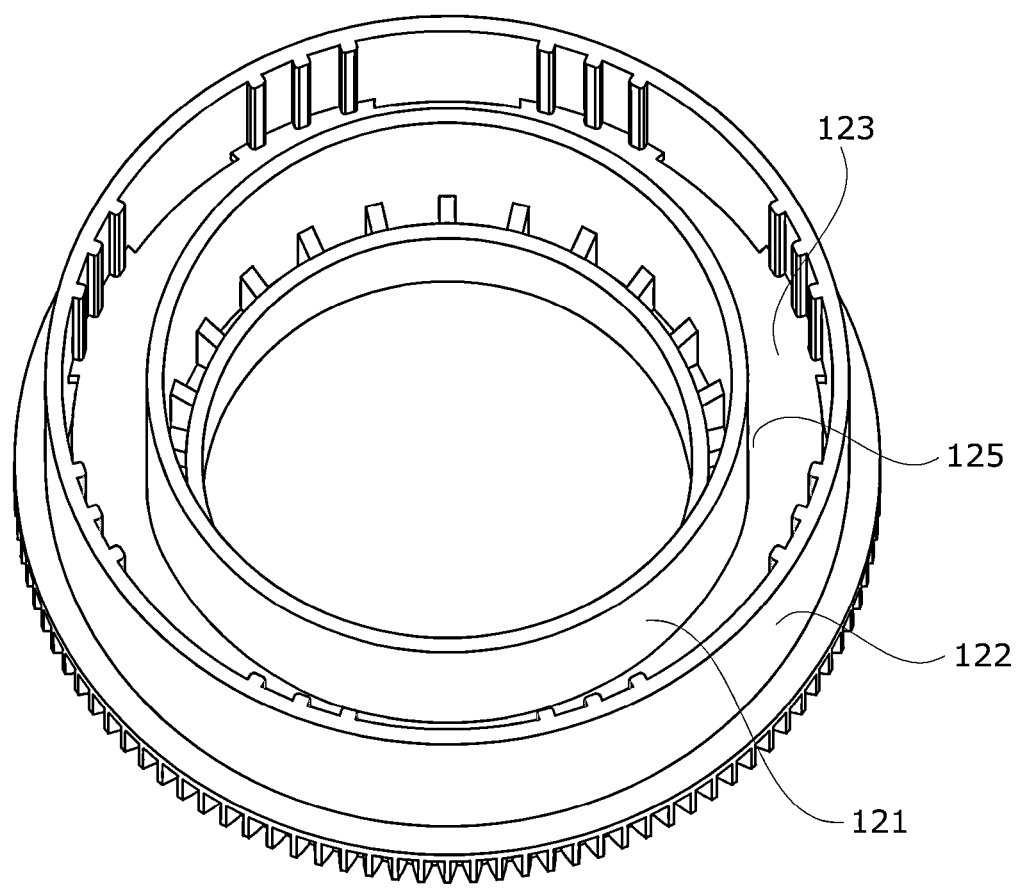
FIG. 7 is a perspective view illustrating a stator body of the stator.
Figure 8:
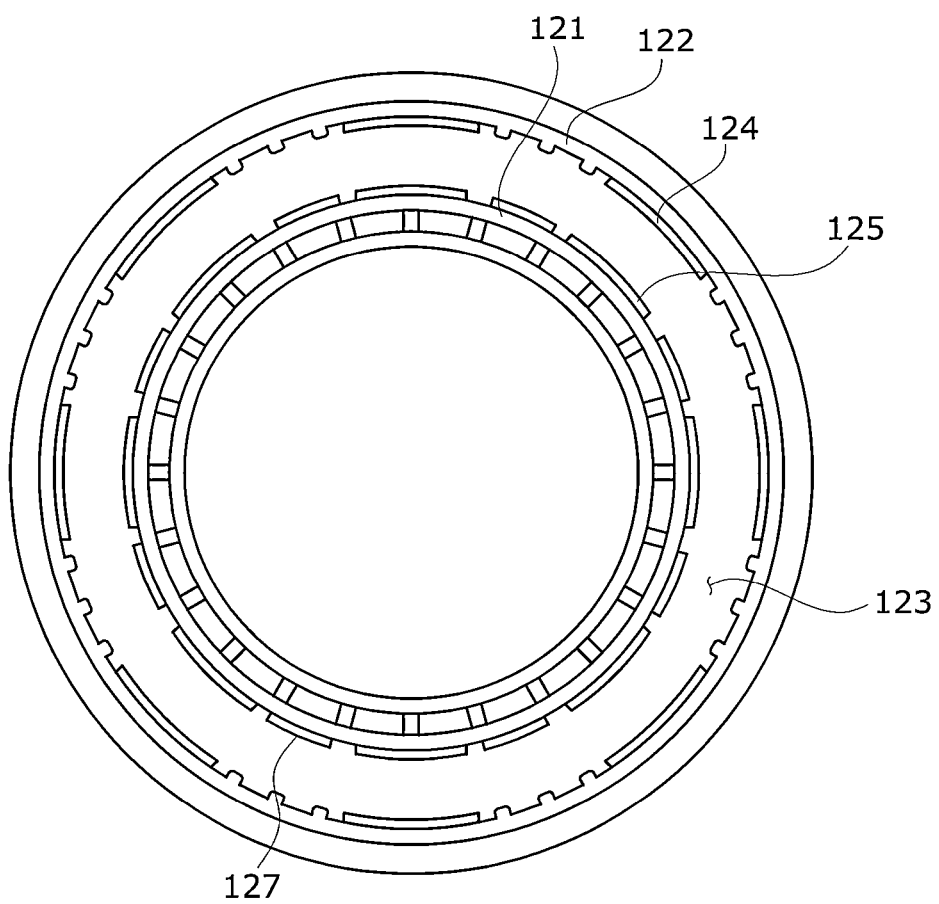
FIG. 8 is a plan view illustrating the stator body of the stator.
Figure 9:
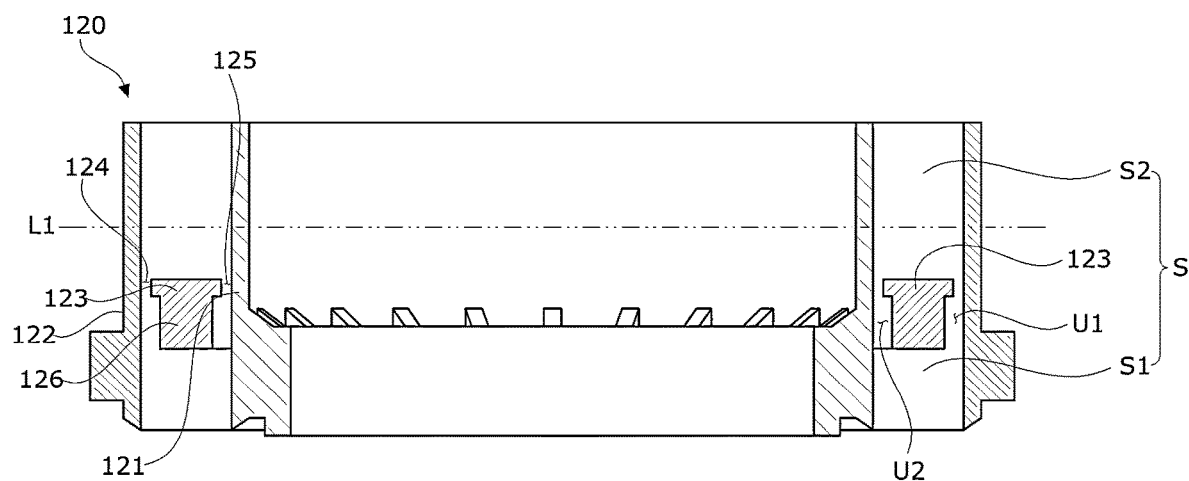
FIGS. 9 and 10 are cross-sectional views illustrating the stator body of the stator.
Figure 10:
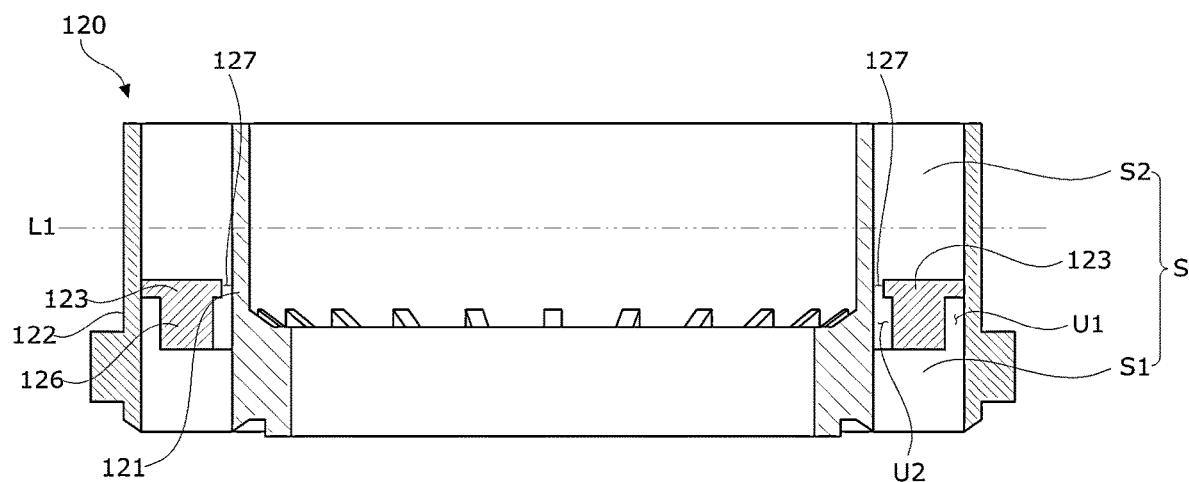

FIG. 7 is a perspective view illustrating the stator body of the stator, FIG. 8 is a plan view illustrating the stator body of the stator, and FIGS. 9 and 10 are cross-sectional views illustrating the stator body of the stator.

Referring to FIGS. 7 to 10, the stator body 120 includes an inner side portion 121, an outer side portion 122, and a partition plate 123. The inner side portion 121 and the outer side portion 122 each have a cylindrical shape. The outer side portion 122 is disposed to be spaced apart from an outer side of the inner side portion 121 in the radial direction. The partition plate 123 connects the inner side portion 121 and the outer side portion 122. The inner side portion 121, the outer side portion 122, and the partition plate 123 may be integrated. The stator holder 110 may be coupled to an inner side of the inner side portion 121. A space S may be formed between the outer side portion 122 and the inner side portion 121. The partition plate 123 may be formed in a plate shape. The partition plate 123 may be disposed between the inner side portion 121 and the outer side portion 122.

The space S may be partitioned into a first space S1 and a second space S2 by the partition plate 123. A magnet 230 may be disposed in the first space S1, and the sensor 500 may be disposed in the second space S2. The partition plate 123 may be disposed under a reference line L1. The reference line L1 is a virtual horizontal line passing through a center of the outer side portion 122 with respect to an axial direction.

Meanwhile, the partition plate 123 may include a first hole 124 and a second hole 125. The first hole 124 and the second hole 125 are provided to dispose the first stator tooth 130 and the second stator tooth 140.

The first body 131 and the second body 141 may be disposed in the first space S1. The first tooth 132 and the second tooth 142 may be disposed in the second space S2.

A plurality of first holes 124 may be formed to be spaced apart from each other in a circumferential direction. Further, the first teeth 132 are disposed in the second space S2 through the first holes 124. In this case, the number of first holes 124 is the same as the number of first teeth 132. The first holes 124 may be disposed adjacent to an inner circumferential surface of the outer side portion 122. As shown in FIG. 8, the first holes 124 may be formed in the partition plate 123 to abut the inner circumferential surface of the outer side portion 122.

A plurality of second holes 125 may be formed to be spaced apart from each other in the circumferential direction. In this case, the second hole 125 may be disposed to be spaced apart from an inner side of the first hole 124 in the radial direction. Further, the second teeth 142 are disposed in the second space S2 through the second holes 125. In this case, the number of second holes 125 is the same as the number of second teeth 142 of the second stator tooth 140. The second holes 125 may be disposed adjacent to an outer circumferential surface of the inner side portion 121. As shown in FIG. 8, the second holes 125 may be formed in the partition plate 123 to abut the outer circumferential surface of the inner side portion 121.

A plurality of third holes 127 may be formed to be spaced apart from each other in the circumferential direction. In this case, the third hole 127 may be disposed between the second holes 125 in the radial direction. Further, the third teeth 133 are disposed in the second space S2 through the third holes 127. In this case, the number of third holes 127 is the same as the number of third teeth 133 of the first stator tooth 130. The third holes 127 may be disposed adjacent to the outer circumferential surface of the inner side portion 121. As shown in FIG. 8, the third holes 127 may be formed in the partition plate 123 to abut the outer circumferential surface of the inner side portion 121.

The first stator tooth 130 and the second stator tooth 140 may be disposed between the outer circumferential surface of the inner side portion 121 and the inner circumferential surface of the outer side portion 122 of the stator body 120. Here, the first stator tooth 130 and the second stator tooth 140 may be formed of a metal material for charging by rotation of the magnet 230.

Further, the first stator tooth 130 may be fixed to the inner circumferential surface of the outer side portion 122 by an adhesive member (not shown) such as a bond, and the second stator tooth 140 may be fixed to the outer circumferential surface of the inner side portion 121 by an adhesive member (not shown) such as a bond, but are not necessarily limited thereto. For example, each of the first stator tooth 130 and the second stator tooth 140 may be fixed to the stator body 120 through a fastening member (not shown), a caulking method, or the like.

A boss 126 is disposed to extend to a lower side of a partition plate 123. A sidewall of the boss 126 and the outer side portion 122 are spaced apart from each other to form a first slot U1. The first tooth 132 is inserted into the first slot U1 and passes through the first hole 124 to be located in the second space S2. Further, the sidewall of the boss 126 and the inner side portion 121 are spaced apart from each other to form a second slot U2. The second tooth 142 and the third tooth 133 are inserted into the second slot U2 and pass through the second hole 125 and the third hole 127, respectively, to be located in the second space S2.

The first slot U1 guides the first tooth 132 to the first hole 124 while the first stator tooth 130 is coupled to the stator body 120 to facilitate coupling.

The second slot U2 guides the second tooth 142 and the third tooth 133 to the second hole 125 and the third hole 127, respectively, while the second stator tooth 140 is coupled to the stator body 120 to facilitate the coupling.

Figure 11:
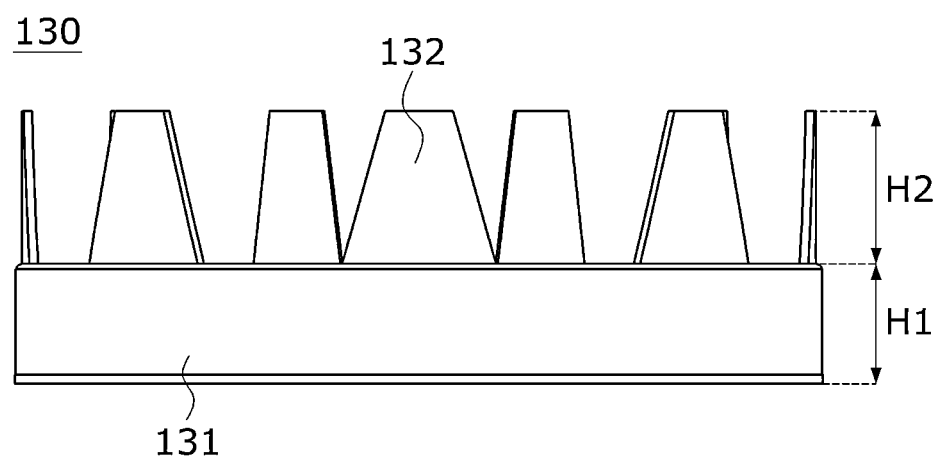
FIG. 11 is a side view illustrating a first stator tooth.
Figure 12:
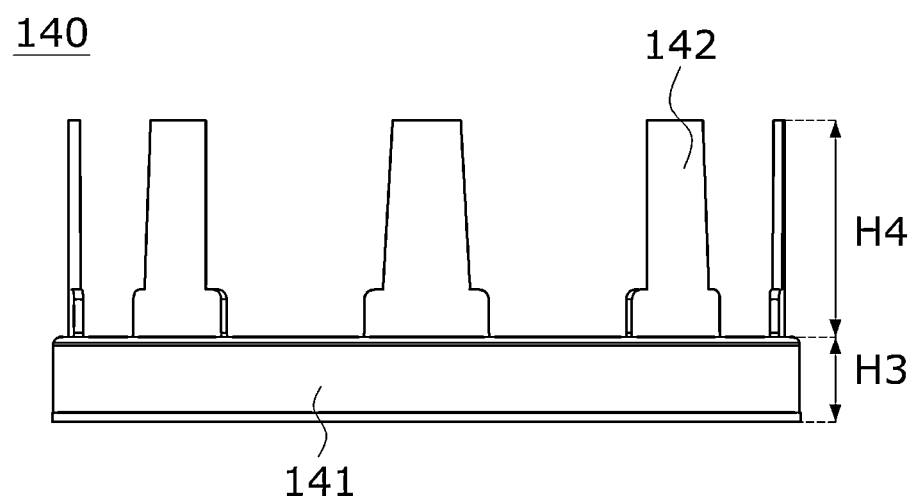
FIG. 12 is a side view illustrating a second stator tooth.

FIG. 11 is a side view illustrating the first stator tooth, and FIG. 12 is a side view illustrating the second stator tooth.

Referring to FIGS. 5 and 11, the first stator tooth 130 may include the first body 131 and the plurality of first teeth 132 spaced apart from each other on the first body 131 and protruding in the axial direction. Referring to FIGS. 5 and 12, the second stator tooth 140 may include the second body 141 and the plurality of second teeth 142 spaced apart from each other on the second body 141 and protruding in the axial direction.

A height H1 of the first body 131 with respect to an upper surface 131a of the first body 131 is smaller than a height H2 of the first tooth 132. Further, a height H3 of the second body 141 with respect to an upper surface 141a of the second body 141 is smaller than a height H4 of the second tooth 142. However, the present invention is not limited thereto, and the height H2 of the first tooth 132 may be different from the height H4 of the second tooth 142.

Figure 13:
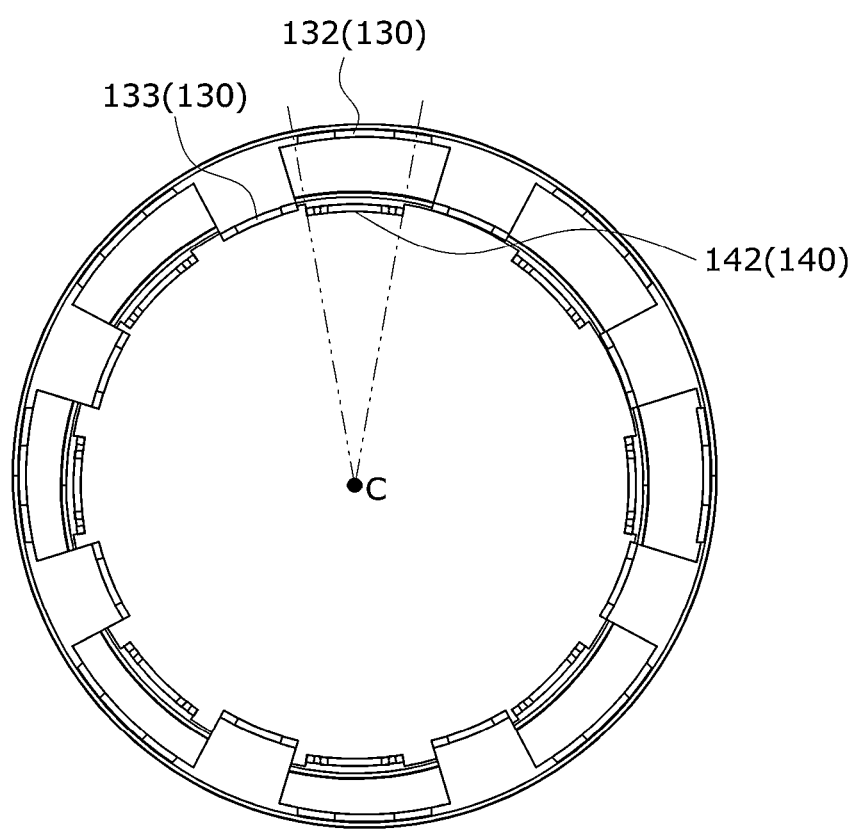
FIG. 13 is a plan view illustrating the first stator tooth and the second stator tooth.

FIG. 13 is a plan view illustrating the first stator tooth, the second stator tooth, and the magnet.

Referring to FIG. 13, the first stator tooth 130 is disposed at an outer side of the second stator tooth 140. When viewed in the radial direction (y-direction), the first teeth 132 and the second teeth 142 may be disposed to overlap each other in the radial direction. This arrangement of the first teeth 132 and the second teeth 142 has an effect of reducing magnetic flux leakage.

Figure 14:
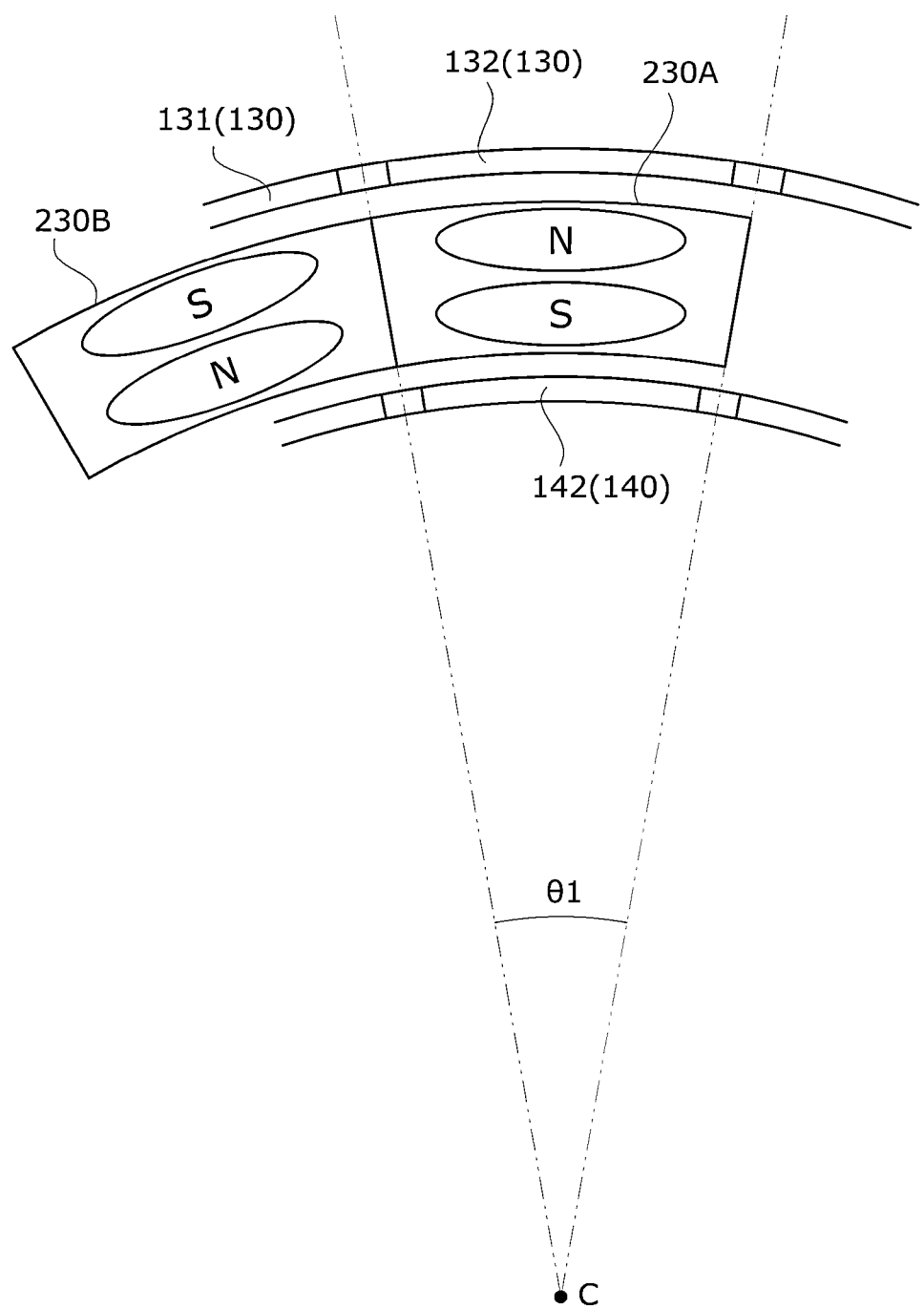
FIG. 14 is a view illustrating a first pole and a second pole of a magnet.

FIG. 14 is a view illustrating a first pole and a second pole of the magnet.

Referring to FIG. 14, the magnet includes a first pole 230A and a second pole 230B. The first pole 230A and the second pole 230B may be alternately disposed along a circumferential direction of the magnet.

The first pole 230A and the second pole 230B may both include an N-pole region NA and an S-pole region SA. The first pole 230A and the second pole 230B may both have a multi-layer structure in which the N-pole region NA and the S-pole region SA are partitioned into inner and outer sides.

In the first pole 230A, the N-pole region NA may be disposed at a relatively outer side, and the S-pole region S may be disposed at an inner side of the N-pole region NA. In the second pole 230B, the N-pole region NA may be disposed at a relatively inner side, and the S-pole region SA may be disposed at an outer side of the N-pole region NA.

The N-pole region NA of the first pole 230A and the S-pole region SA of the second pole 230B are disposed adjacent to each other. The S-pole region SA of the first pole 230A and the N-pole region NA of the second pole 230B are disposed adjacent to each other.

When the magnet 230 rotates and thus the first tooth 132 is charged with an S polarity as the S-pole region SA approaches, the second tooth 142 is charged with an N-polarity as the N-pole region NA approaches. Alternatively, when the magnet 230 rotates and thus the first tooth 132 is charged with the N-polarity as the N-pole region NA approaches, the second tooth 142 is charged with the S-polarity as the S-pole region SA approaches. Accordingly, the sensor 500 may measure an angle through a magnetic field applied through the first stator tooth 130, the second stator tooth 140, and a collector (300 in FIG. 28).

In the sensing device according to the embodiment, the first tooth 132 and the second tooth 142 overlap each other in the radial direction. Both ends of the second tooth 142 may overlap the first tooth 132. For example, in designing positions and sizes of the first tooth 132 and the second tooth 142, a first angle θ1, a second angle θ2, and a third angle θ3 may be the same.

The first angle θ1 represents an angle formed by both ends of the first pole 230A with respect to the stator center C. For example, when the number of first poles 230A is eight and the number of second poles 230B is eight, the first angle θ1 may be 22.5°.

Figure 15:
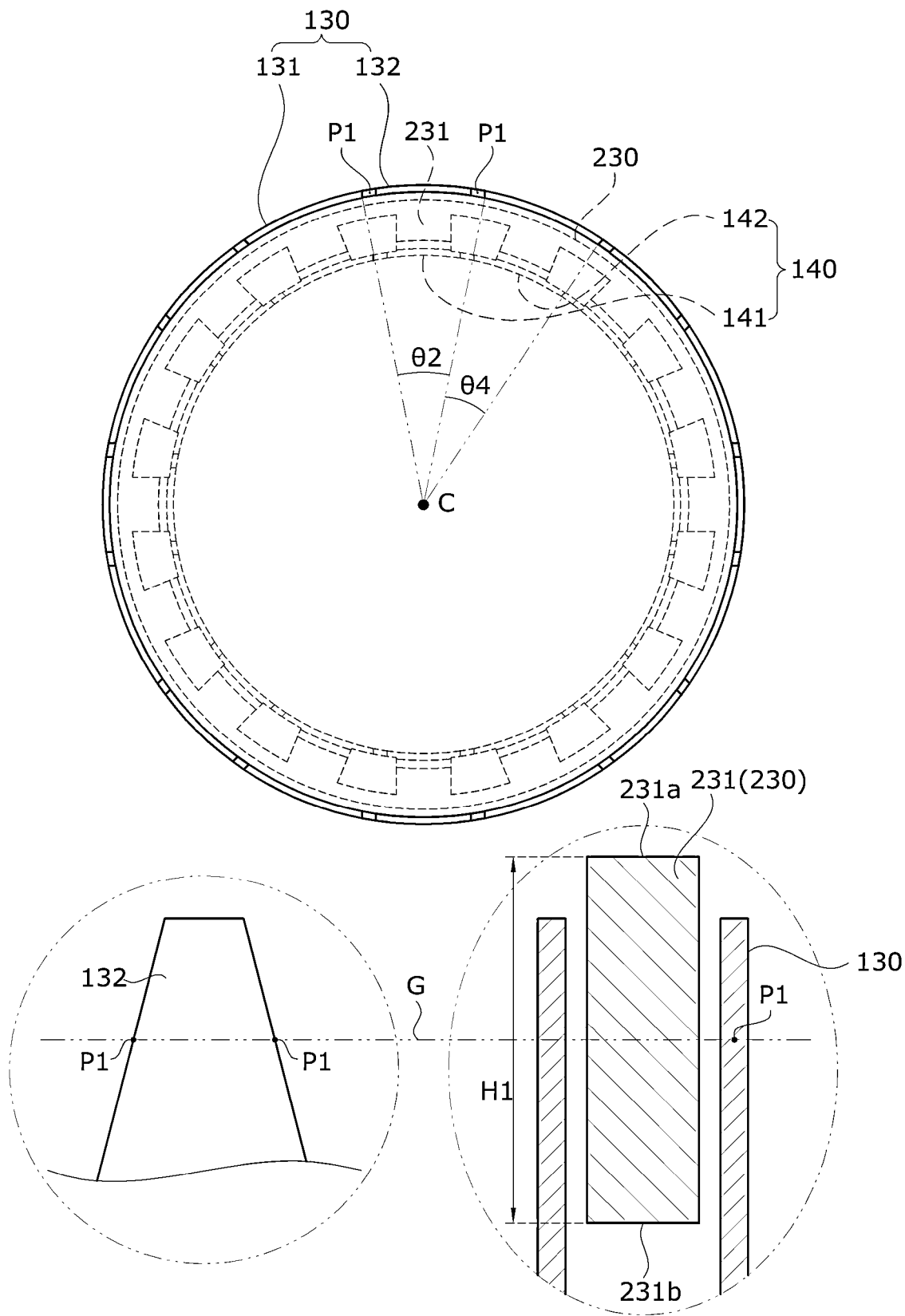
FIG. 15 is a view illustrating a second angle.
Figure 16:
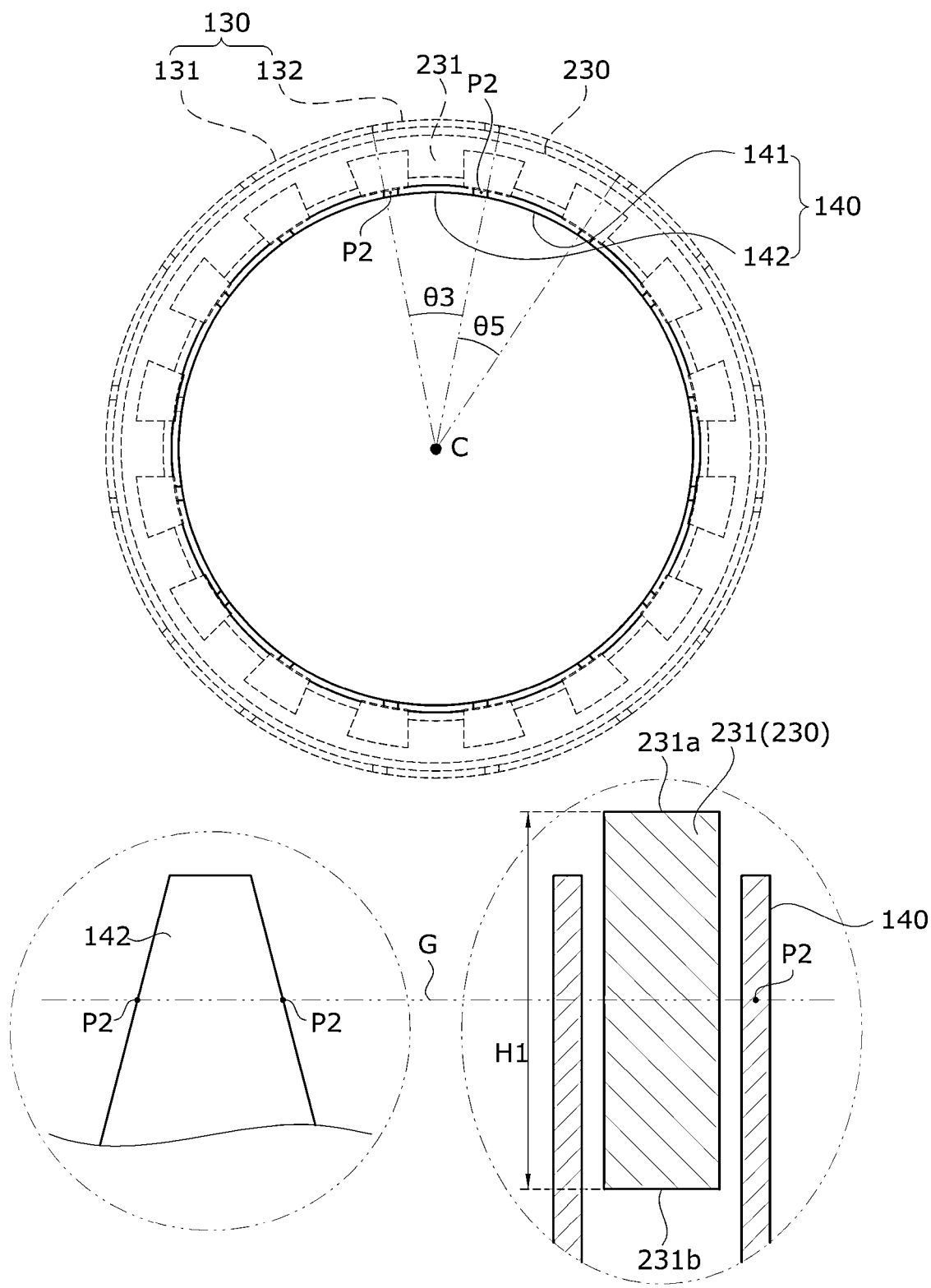
FIG. 16 is a view illustrating a third angle.

FIG. 15 is a view illustrating the second angle θ2, and FIG. 16 is a view illustrating the third angle θ3.

Referring to FIG. 15, the second angle θ2 represents an angle formed by both ends P1 of the first tooth 132 with respect to the stator center C. In the axial direction, a reference point G which defines both ends P1 of the first tooth 132 is as follows. The reference point G is a point of the first tooth 132 corresponding to a middle point of the height H1 of a body 231 of the magnet 230 when the first tooth 132 and the body 231 of the magnet 230 are disposed to face each other. The height H1 of the body 231 of the magnet 230 indicates a height formed by an upper surface 231a and a lower surface 231b of the magnet 230 in the axial direction. An angle θ4 between the first teeth 132—at the reference point G may be the same as the second angle θ2.

Referring to FIG. 16, the third angle θ3 represents an angle formed by both ends P2 of the second tooth 142 with respect to the stator center C. In the axial direction, the reference point G which defines both ends P2 of the second tooth 142 is as follows. The reference point G is a point of the second tooth 142 corresponding to a middle point of the height H1 of the body 231 of the magnet 230 when the second tooth 142 and the body 231 of the magnet 230 are disposed to face each other. An angle θ5 between the second teeth 142 at the reference point G may be the same as the third angle θ3.

FIG. 17 is a graph illustrating flux versus the first angle θ1, the second angle θ2, and the third angle θ3.

Referring to FIG. 17, in a state in which the second angle θ2 and the third angle θ3 are set to be the same, it can be confirmed that the magnitude of the flux increases as the second angle θ2 and the third angle θ3 approach the first angle θ1, and the magnitude of the flux decreases as the second angle θ2 and the third angle θ3 move away from the first angle θ1. When the sizes and positions of the first tooth 132 and the second tooth 142 are aligned so that the second angle θ2 and the third angle θ3 are the same as the first angle θ1, it can be seen that the magnitude of the flux of the first and second stator teeth 130 and 140 is the largest.

Figure 18:
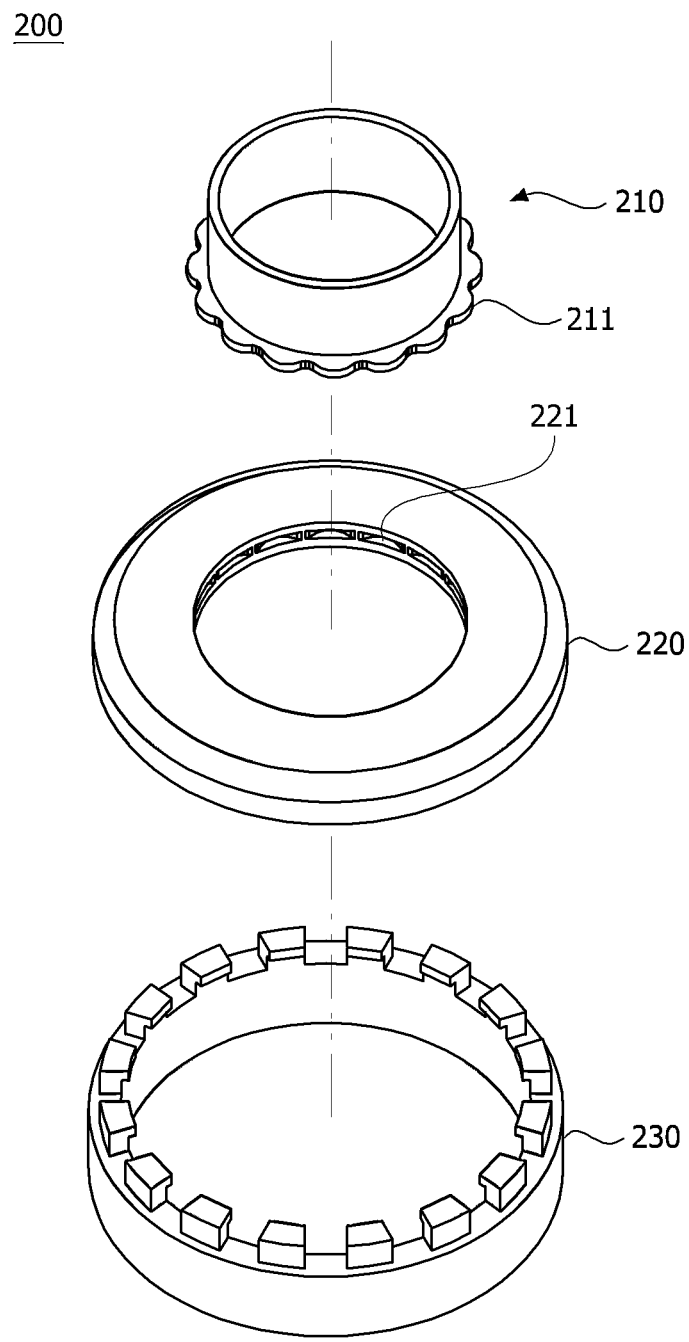
FIG. 18 is an exploded perspective view of a rotor.

FIG. 18 is an exploded perspective view of the rotor.

Referring to FIGS. 2 and 18, the rotor 200 may include a rotor holder 210, a rotor body 220, and the magnet 230. The rotor holder 210, the rotor body 220, and the magnet 230 may be integrated.

The rotor holder 210 may be connected to an input shaft of the electric steering device. Accordingly, the rotor holder 210 may rotate in conjunction with rotation of the input shaft. The rotor holder 210 may be formed in a cylindrical shape. Further, an end portion of the rotor holder 210 may be coupled to the rotor body 220. The rotor holder 210 may be formed of a metal material, but is not necessarily limited thereto, and the rotor holder 210 may be formed of a different material in consideration of strength greater than or equal to a predetermined level so that the input shaft may be fitted and fixed thereto.

A protrusion 211 of the rotor holder 210 may be included. The protrusion 211 may be disposed to extend in the radial direction from an outer circumferential surface of the rotor holder 210.

The rotor body 220 is disposed at one side of the outer circumferential surface of the rotor holder 210. The rotor body 220 may be a ring-shaped member. A groove 221 may be disposed on an inner circumferential surface of the rotor body 220. The groove 221 is a place into which the protrusion of the rotor holder 210 is inserted.

The magnet 230 is coupled to the rotor body 220. The magnet 230 rotates in conjunction with rotation of the rotor holder 210.

Figure 19:
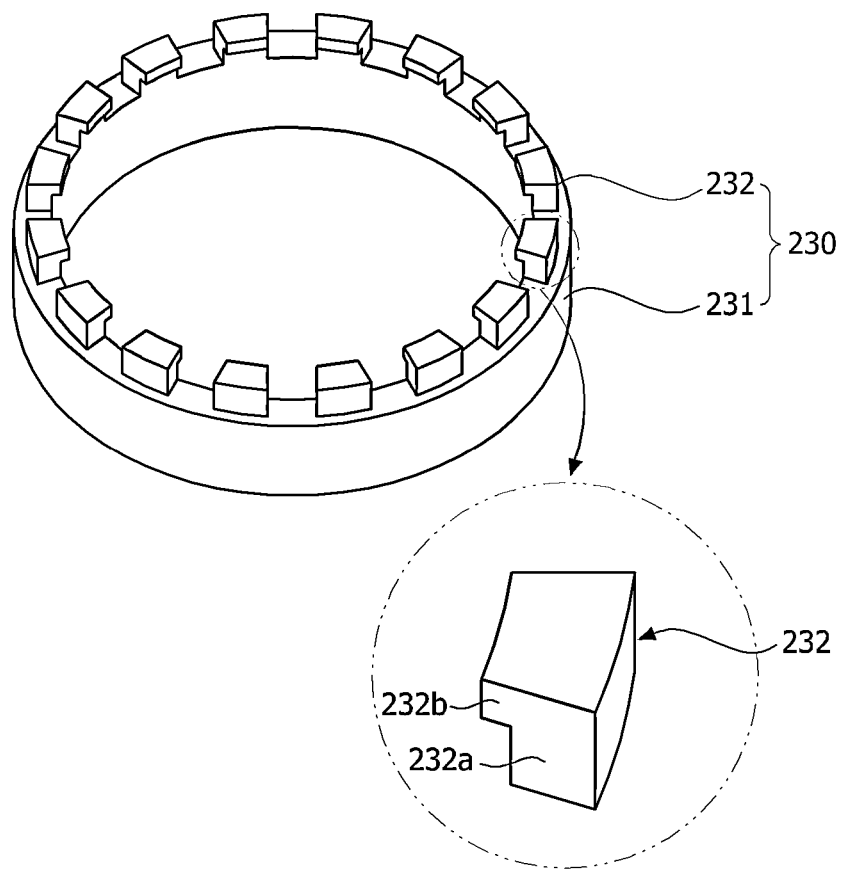
FIG. 19 is a view illustrating the magnet.
Figure 20:
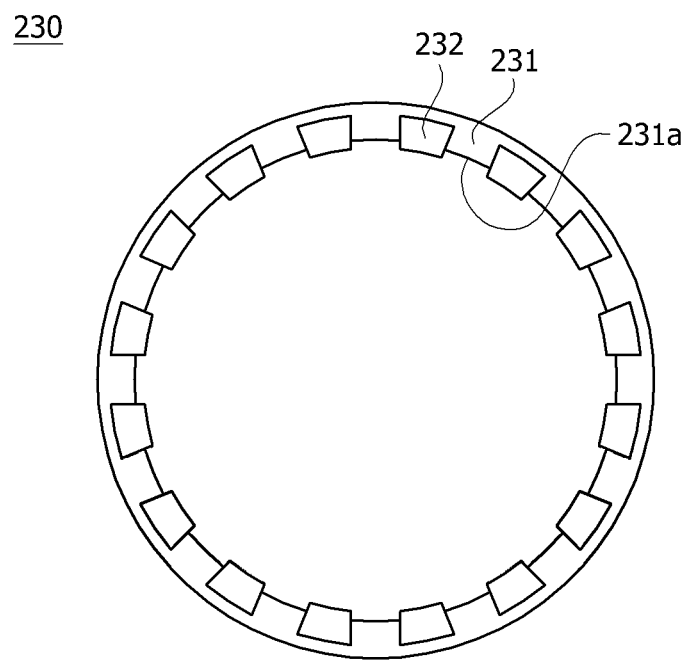
FIG. 20 is a plan view of the magnet.

FIG. 19 is a view illustrating the magnet, and FIG. 20 is a plan view of the magnet.

Referring to FIGS. 19 and 20, the magnet 230 may include a ring-shaped body 231 and a protrusion 232 protruding from an upper surface of the body 231. The protrusion 232 may be provided as a plurality of protrusions 232. The protrusion 232 may include a first part 232a and a second part 232b. The first part 232a protrudes upward from the upper surface of the body 231. The second part 232b may be disposed to protrude from the first part 232a in a radial direction of the magnet 230. The second part 232b may protrude inward of an inner circumferential surface 231a of the body 231. These protrusions 232 are provided to increase a coupling force with the rotor body 231. The first part 232a inhibits the rotor body 231 and the magnet 230 from slipping in the rotational direction, and the second part 232b inhibits separation of the rotor body 231 and the magnet 230 in the axial direction.

Figure 21:
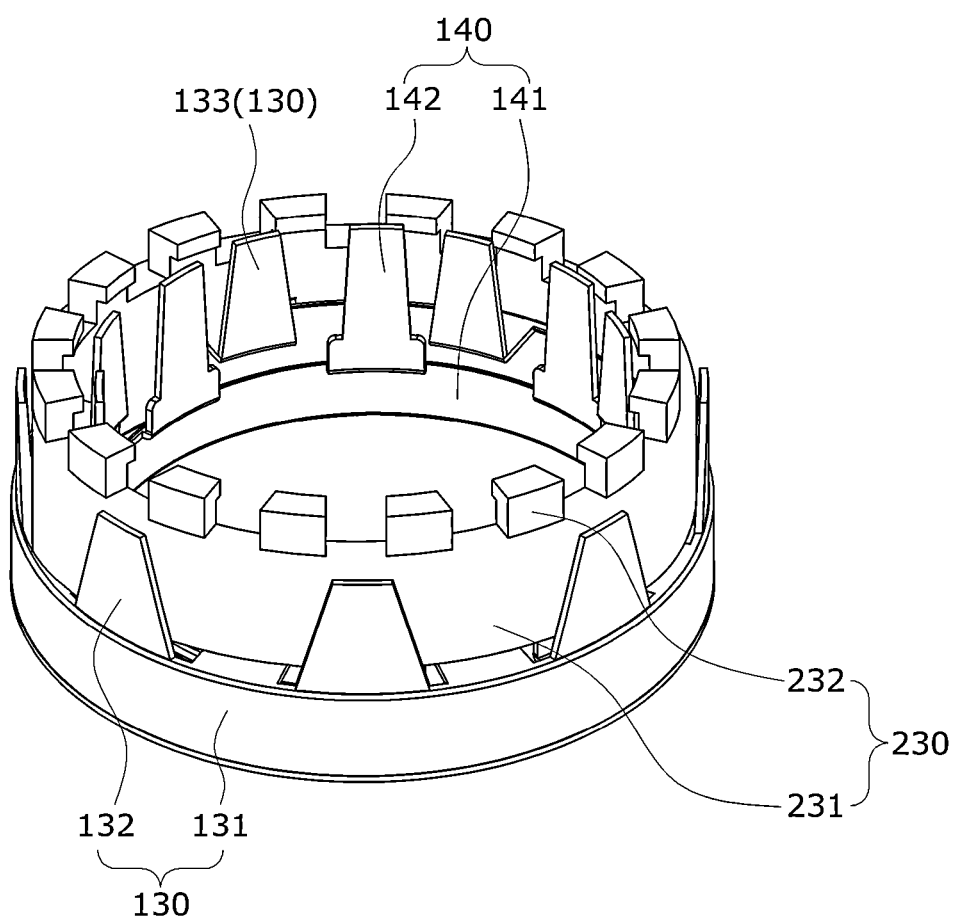
FIG. 21 is a perspective view illustrating disposition of the magnet with respect to the first stator tooth and the second stator tooth.

FIG. 21 is a perspective view illustrating disposition of the magnet with respect to the first stator tooth and the second stator tooth.

Referring to FIG. 21, the magnet 230 is disposed between the first tooth 132 and the second tooth 142. Further, the magnet 230 is disposed between the third tooth 133 and the first tooth 132.

The body 231 of the magnet 230 is disposed to face the first tooth 132, the second tooth 142, and the third tooth 133. The protrusions 232 of the magnet 230 are disposed above the first tooth 132, the second tooth 142, and the third tooth 133.

Figure 22:
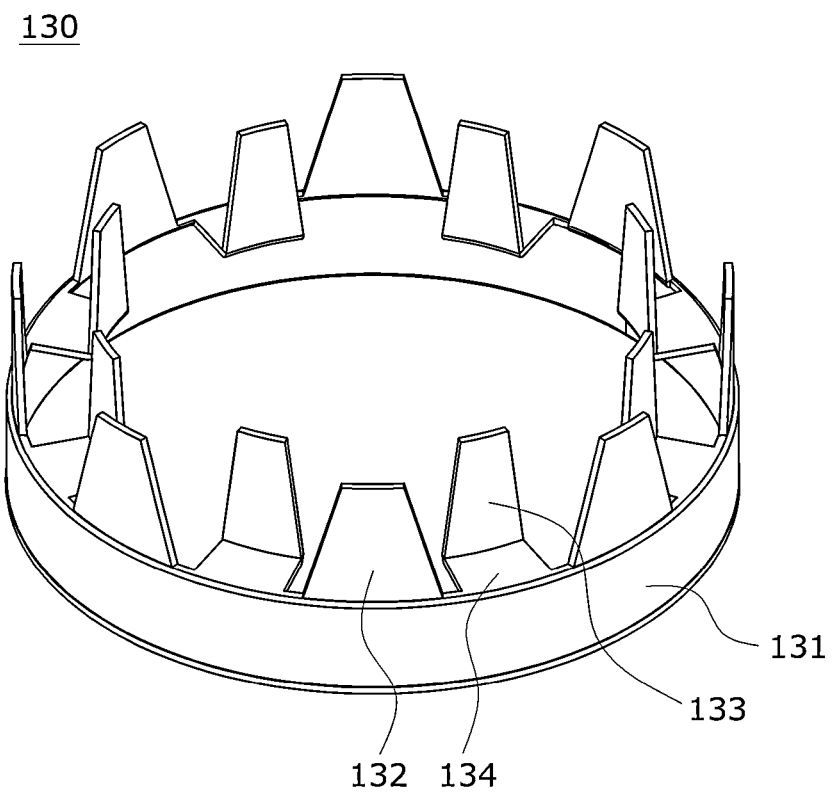
FIG. 22 is a perspective view illustrating the first stator tooth.

FIG. 22 is a perspective view illustrating the first stator tooth.

Referring to FIG. 22, the first stator tooth 130 may include the first body 131, the first tooth 132, the third tooth 133, and an extending portion 134. The first body 131 may be a ring-shaped member. The first teeth 132 may be disposed to be spaced apart from each other in the circumferential direction, and may extend upward from an upper side of the first body 131. The first body 131 and the plurality of first teeth 132 may be integrally formed. The extending portion 134 protrudes inward from the first body 131. The third tooth 133 is connected to the extending portion 134.

The first tooth 132 and the third tooth 133 may each be formed in a shape having a wide lower portion and a narrow upper portion. For example, when viewed in the radial direction, a lower width of each of the first tooth 132 and the third tooth 133 may be greater than an upper width of each of the first tooth 132 and the third tooth 133. The first tooth 132 and the third tooth 133 may each be formed in a trapezoidal shape. Further, as the first tooth 132 passes through the first hole 124 and the third tooth 133 passes through the third hole 127, upper surfaces of the first body 131 and the extending portion 134 may come into contact with a lower surface of the partition plate 123.

Figure 23:
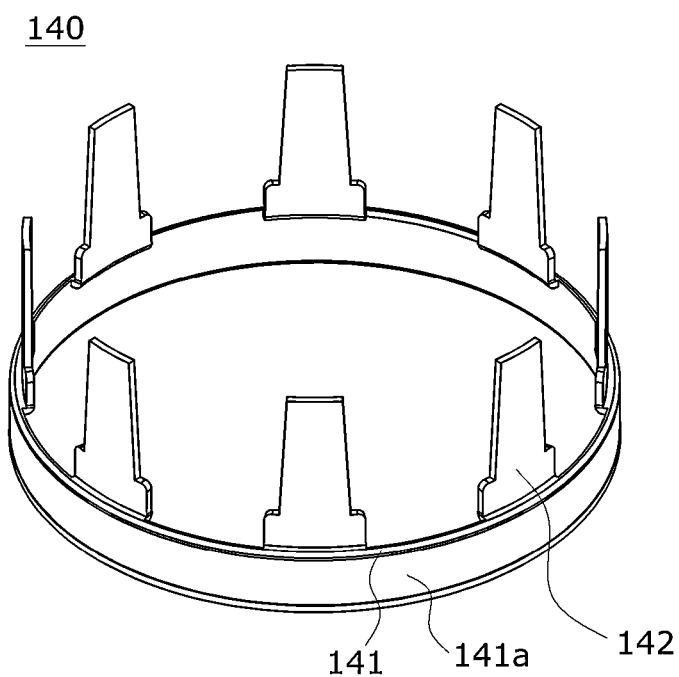
FIG. 23 is a perspective view illustrating the second stator tooth.

FIG. 23 is a perspective view illustrating the second stator tooth.

Referring to FIG. 23, the second stator tooth 140 may include the second body 141 and the second tooth 142. The second teeth 142 may be disposed to be spaced apart from each other in the circumferential direction, and may extend upward from an upper side of the second body 141. The second body 141 and the plurality of second teeth 142 may be integrally formed. The second tooth 142 may be formed in a shape having a wide lower portion and a narrow upper portion. For example, when viewed in the radial direction, a lower width of the second tooth 142 may be greater than an upper width of the second tooth 142. The second tooth 142 may have a trapezoidal shape.

The second body 141 may include a protruding portion 141a. The protruding portion 141a may be a ring-shaped member which is bent outwardly and protrudes with respect to the second tooth 142. The protruding portion 141a increases an amount of flux applied to the sensor 500 by reducing an air gap between the sensor 500 and the second body 141.

Figure 24:
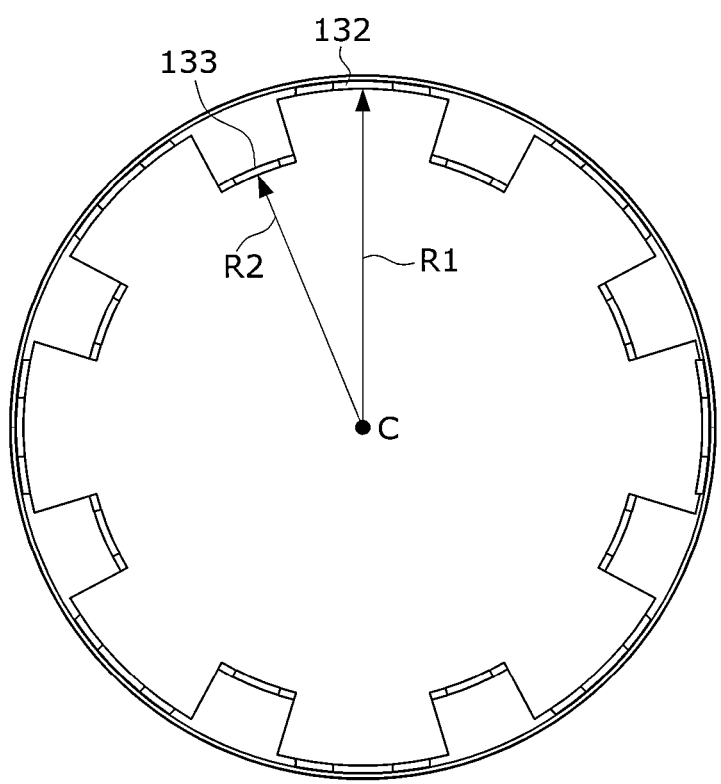
FIG. 24 is a plan view of the first stator tooth.

FIG. 24 is a plan view of the first stator tooth.

Referring to FIG. 24, the shortest distance R1 from a center C of the first stator tooth 130 to the first tooth 132 is larger than the shortest distance R2 from the center C of the first stator tooth 130 to the third tooth 133. Relatively, the third tooth 133 is disposed closer to the center C of the first stator tooth 130 than the first tooth 132. This is to guide an external magnetic field introduced from an inner side of the stator holder 110 to the third tooth 133.

Figure 25:
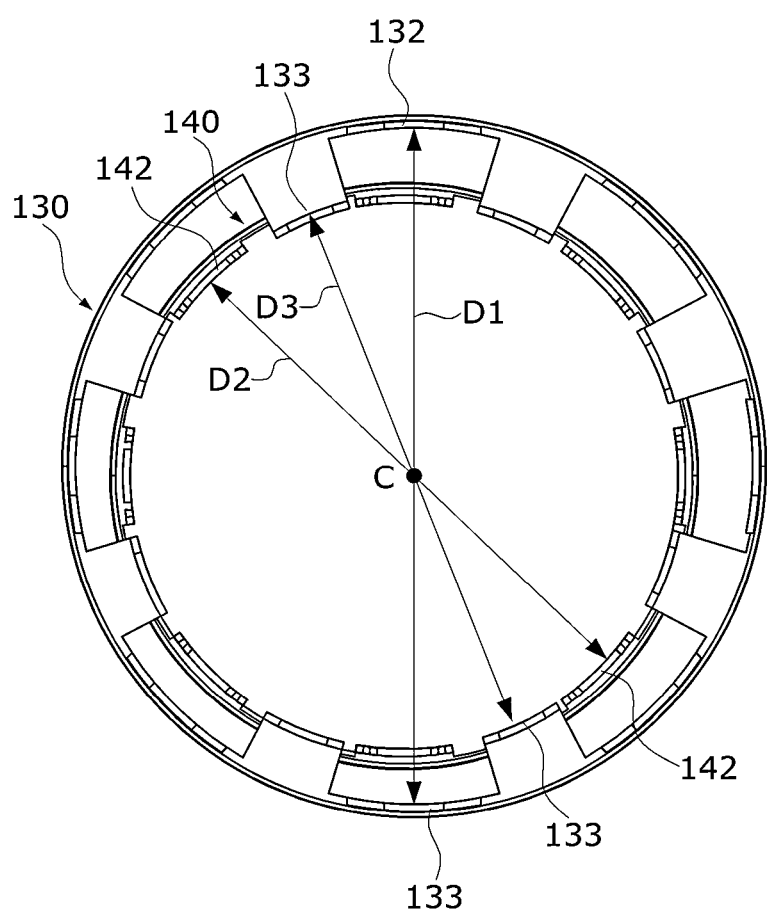
FIG. 25 is a plan view of the first stator tooth and the second stator tooth.

FIG. 25 is a plan view of the first stator tooth and the second stator tooth.

Referring to FIG. 25, a diameter D3 formed by the plurality of third teeth 133 is smaller than a diameter D1 formed by the plurality of first teeth 132, and a diameter D2 formed by the plurality of second teeth 142 is smaller than the diameter D1 formed by the plurality of first teeth 132. With respect to the magnet 230, the first teeth 132 is disposed at an outer side of the magnet 230, and the second teeth 142 and the third teeth 133 are disposed at an inner side of the magnet 230.

Figure 26:
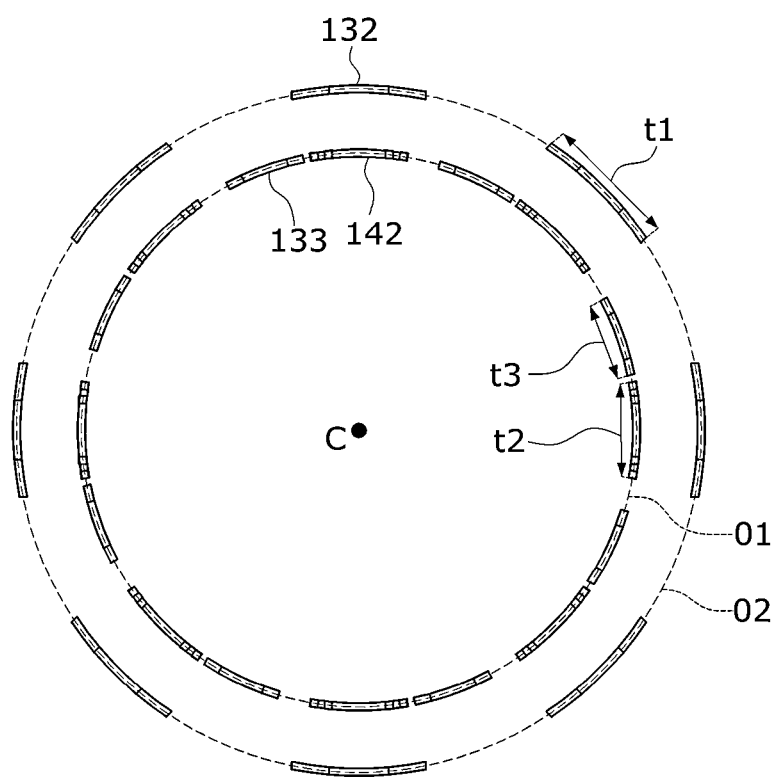
FIG. 26 is a view illustrating a first tooth, a second tooth, and a third tooth which are concentrically disposed.

FIG. 26 is a view illustrating the first tooth, the second tooth, and the third tooth which are concentrically disposed.

Referring to FIG. 26, the first tooth 132, the second tooth 142, and the third tooth 133 may be concentrically disposed. The second tooth 142 and the third tooth 133 may be disposed on a first virtual circumference O1, and the first tooth 132 may be disposed on a second virtual circumference O2 different from the first virtual circumference O1. The second teeth 142 and the third teeth 133 may be alternately disposed along the circumferential direction of the stator 200. The first circumference O1 is disposed at an inner side of the second circumference O2. This is to disperse the external magnetic field introduced from the inner side of the stator holder 110 in all directions through the second teeth 142 and the third teeth 133.

Meanwhile, a width t3 of a lower end of the third tooth 133 in the circumferential direction may be smaller than a width t1 of a lower end of the first tooth 132 in the circumferential direction. Further, the width t3 of the lower end of the third tooth 133 in the circumferential direction may be smaller than a width t2 of a lower end of the second tooth 142 in the circumferential direction.

Figure 27:
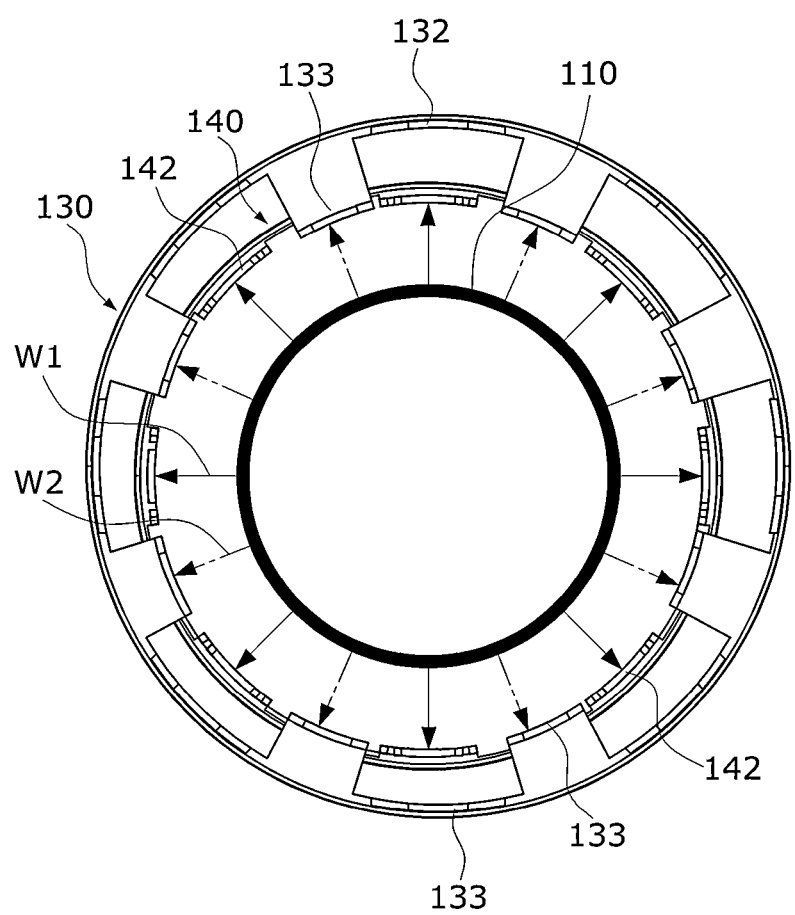
FIG. 27 is a plan view of the first stator tooth and the second stator tooth illustrating a flow of an external magnetic field introduced from an inner side of the stator holder.
Figure 28:
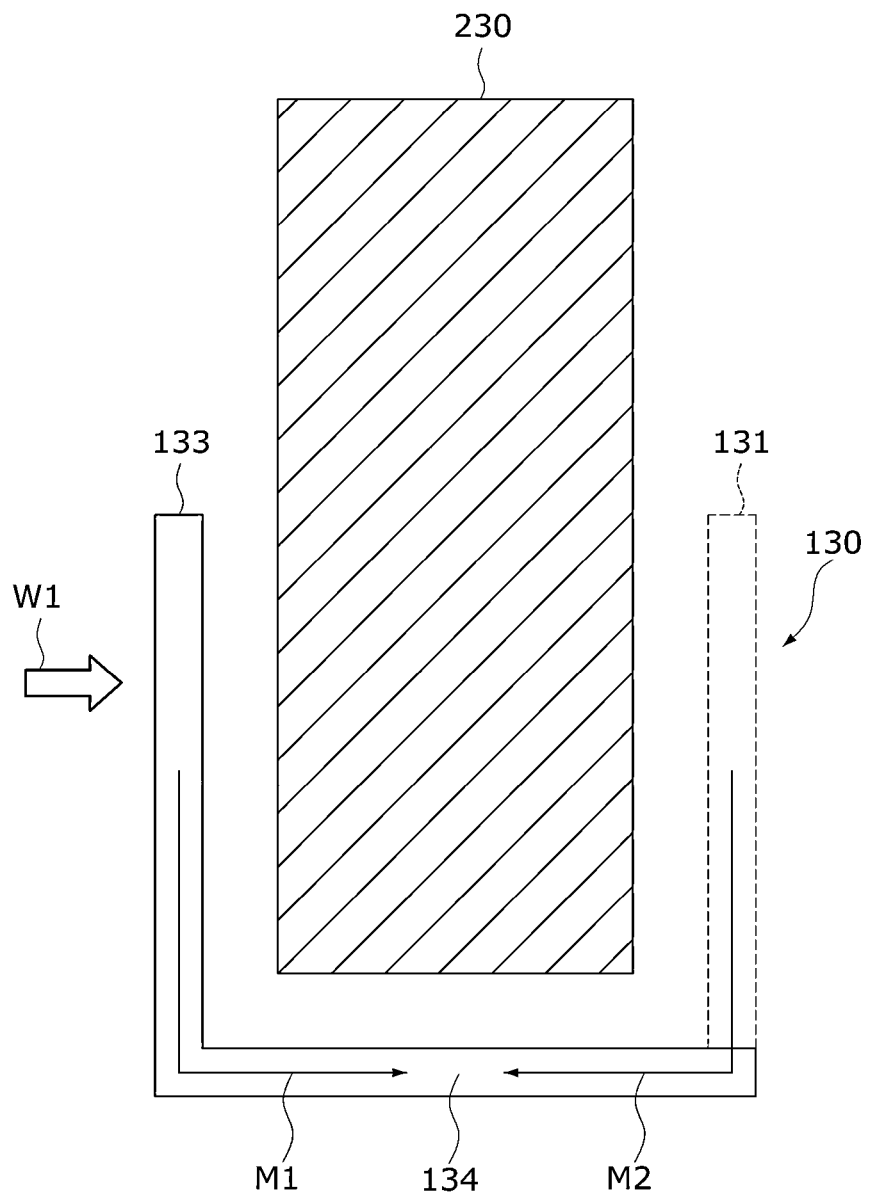
FIG. 28 is a cross-sectional view of the first stator tooth illustrating a flow of the external magnetic field guided to the third tooth.

FIG. 27 is a plan view of the first stator tooth and the second stator tooth illustrating a flow of the external magnetic field introduced from the inner side of the stator holder, and FIG. 28 is a cross-sectional view of the first stator tooth illustrating a flow of the external magnetic field guided to the third tooth.

Referring to FIG. 27, external magnetic fields W1 and W2 introduced along the stator holder 110 are introduced toward the first stator tooth 130 and the second stator tooth 140 in the radial direction of the stator 200. These external magnetic fields W1 and W2 are dispersed and guided to the third tooth 133 along with the second tooth 142.

Referring to FIG. 28, the external magnetic field W1 introduced into the third tooth 133 is guided to the extending portion 134. In this case, an external magnetic field M1 introduced into the third tooth 133 may be offset by an external magnetic field M2 introduced from the magnet 230 into the first tooth 132 and guided to the extending portion 134. Like the above, since the external magnetic field introduced along the stator holder 110 is guided to the first stator tooth 130 and offset, there is an advantage in that influence of the external magnetic field on the sensor 500 can be greatly reduced.

The following Table 1 compares the torques of Comparative Example and Example.

TABLE 1

| | Comparative Example torque (Nm) | Example Torque (Nm) |
|---|---|---|
| External magnetic field in radial direction 1000 A/m | 0.41 Nm | 0.05 Nm |

Comparative Example is a sensing device without a structure such as the third teeth. Example is a sensing device including the third teeth. When there is no external magnetic field in the radial direction, a torque of 0 Nm is normal. In Comparative Example and Example, when an external magnetic field (1000 A/m) is applied in the radial direction, in the case of Comparative Example, it can be seen that a torque of 0.41 Nm is measured and thus is greatly affected by the external magnetic field. However, in the case of Example, it can be seen that a measured torque is 0.05 Nm, which is not greatly affected by the external magnetic field.

Figure 29:
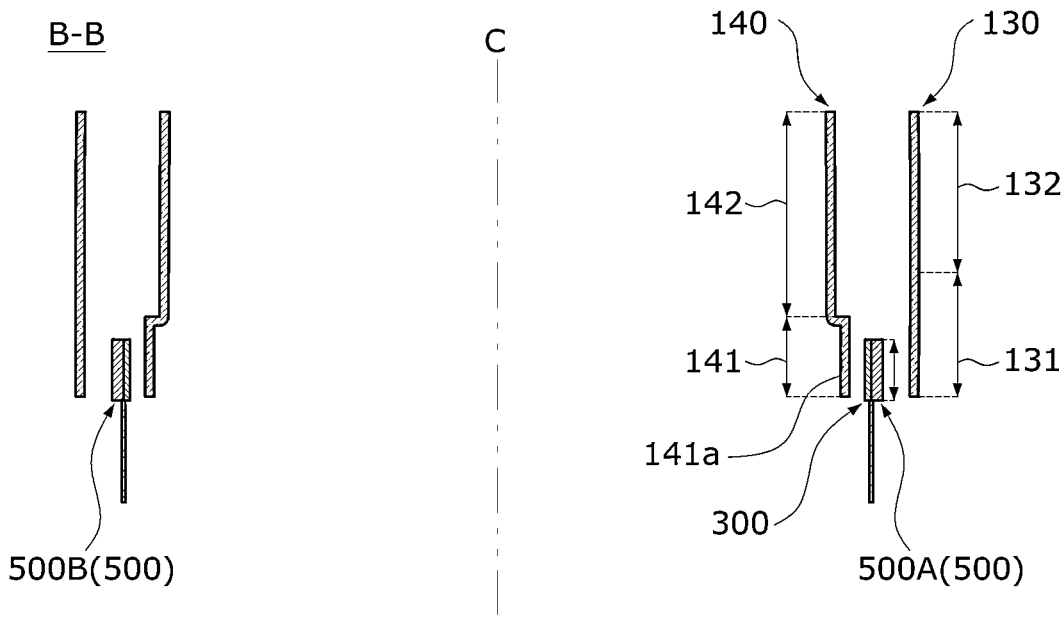
FIG. 29 is a side-sectional view of the first stator tooth, the second stator tooth, a sensor, and a collector.

FIG. 29 is a side-sectional view of the first stator tooth, the second stator tooth, a sensor, and a collector.

Referring to FIG. 29, only one collector 300 is disposed between the first stator tooth 130 and the second stator tooth 140. In order to increase the flux applied to the sensor 500, a protruding portion 141a is disposed in the second stator tooth 140.

When the collector 300 is disposed at an inner side of the sensor 500 and is spaced apart from the first stator tooth 130, there is an advantage in that the collector 300 is less affected by an external magnetic field introduced from the outside of the sensing device 1 in the radial direction. Further, since the protruding portion 141a is bent outward, and thus an air gap between the protruding portion 141a and the stator holder 110 increases in the radial direction, there is an advantage in that the influence of the external magnetic field introduced through the stator holder 110 is reduced.

Since one collector 300 is disposed between the sensor 500 and the second body 141, the configuration of the sensing device may be simplified and the size of the sensing device may be reduced in comparison with a case in which two collectors are disposed, and there is an advantage of securing performance of the sensing device while reducing manufacturing process and costs.

Figure 30:
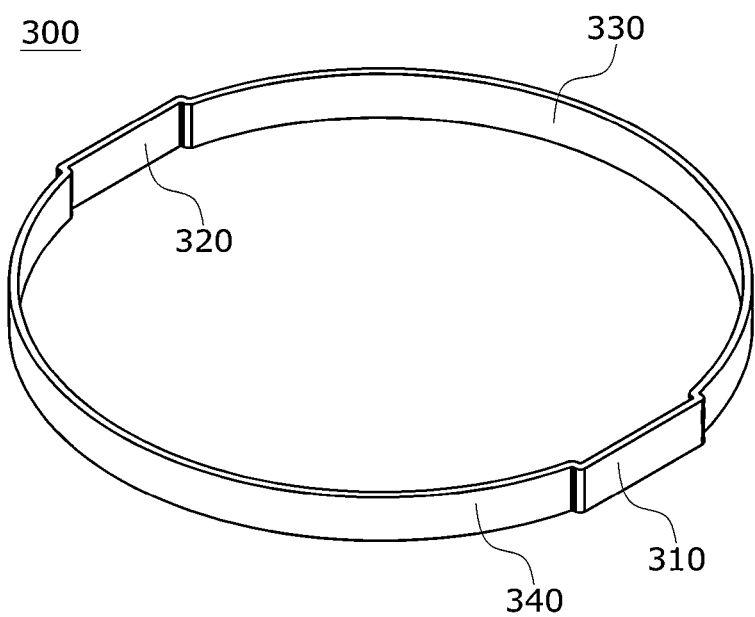
FIG. 30 is a view illustrating the collector.
Figure 31:
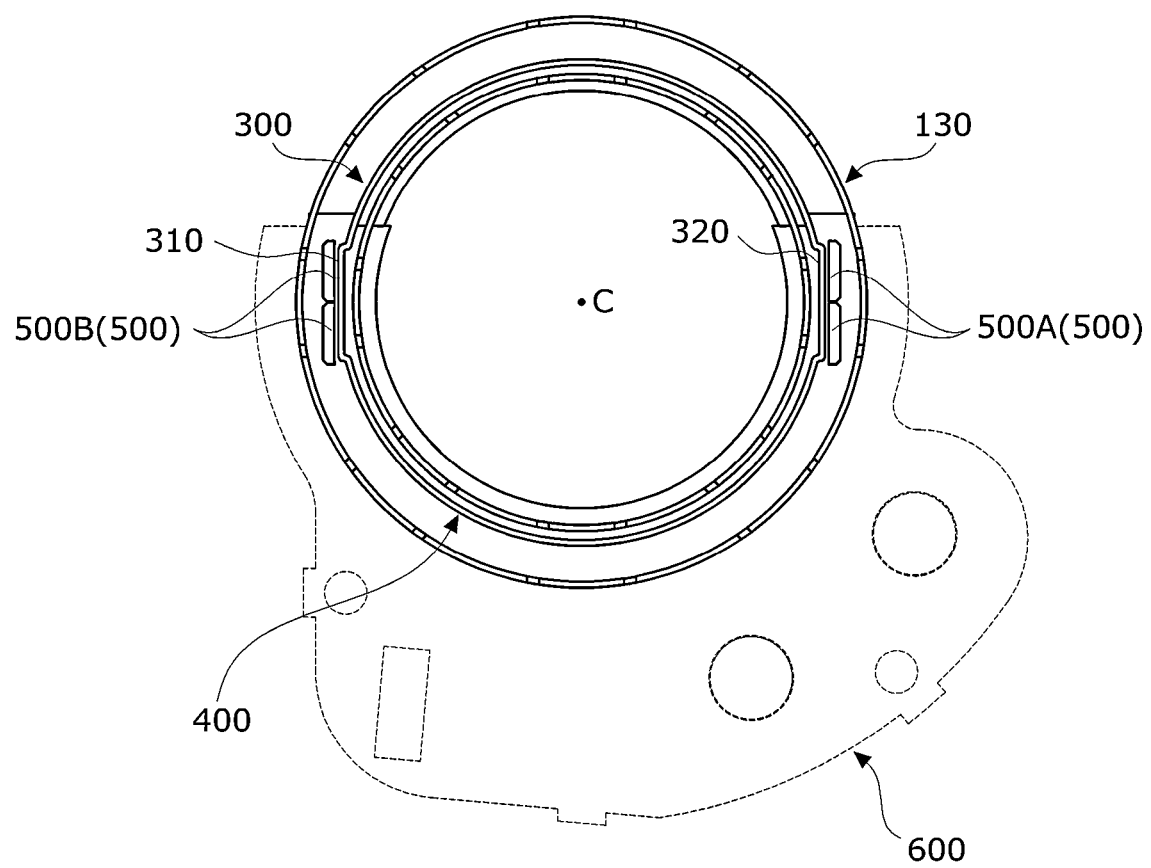
FIG. 31 is a view illustrating the collector disposed between the first stator tooth and the second stator tooth.

FIG. 30 is a view illustrating the collector, and FIG. 31 is a view illustrating the collector disposed between the first stator tooth and the second stator tooth.

Referring to FIGS. 2, 30, and 31, the collectors 300 collect the flux of the stator 100. Here, the collectors 300 may be formed of a metal material, and may be disposed to be spaced apart from each other in the radial direction.

The collector 300 may be a ring-shaped member. The collector 300 may include a first collector body 310, a second collector body 320, a first extending portion 330, and a second extending portion 340.

The first extending portion 330 and the second extending portion 340 both connect the first collector body 310 and the second collector body 320. The first collector body 310 and the second collector body 320 may each include a flat surface, and the first extending portion 330 and the second extending portion 340 may each include a curved surface. The first collector body 310 and the second collector body 320 may be disposed to face each other.

When the collector 300 is formed of two members spaced apart from each other, the two members may be charged with different polarities according to an introduction direction of the external magnetic field, and thus the performance of the sensing device may deteriorate. Since the collector 300 of the sensing device according to the embodiment is made of one member, there is an advantage in that this problem is fundamentally removed.

The sensor 500 detects a change in a magnetic field generated between the stator 100 and the rotor 200. The sensor 500 may be a Hall integrated circuit (IC). The sensor 500 detects an amount of magnetization of the stator 100 generated by an electrical interaction between the magnet 230 of the rotor 200 and the stator 100. The sensing device 1 measures the torque based on the detected amount of magnetization.

Two sensors 500A and 500B may be disposed in the sensor 500. With respect to the center C of the stator, the two sensors 500A and 500B may be disposed to face each other.

The first collector body 310 and the second collector body 320 are disposed to face the sensors 500A and 500B, respectively.

Figure 32:
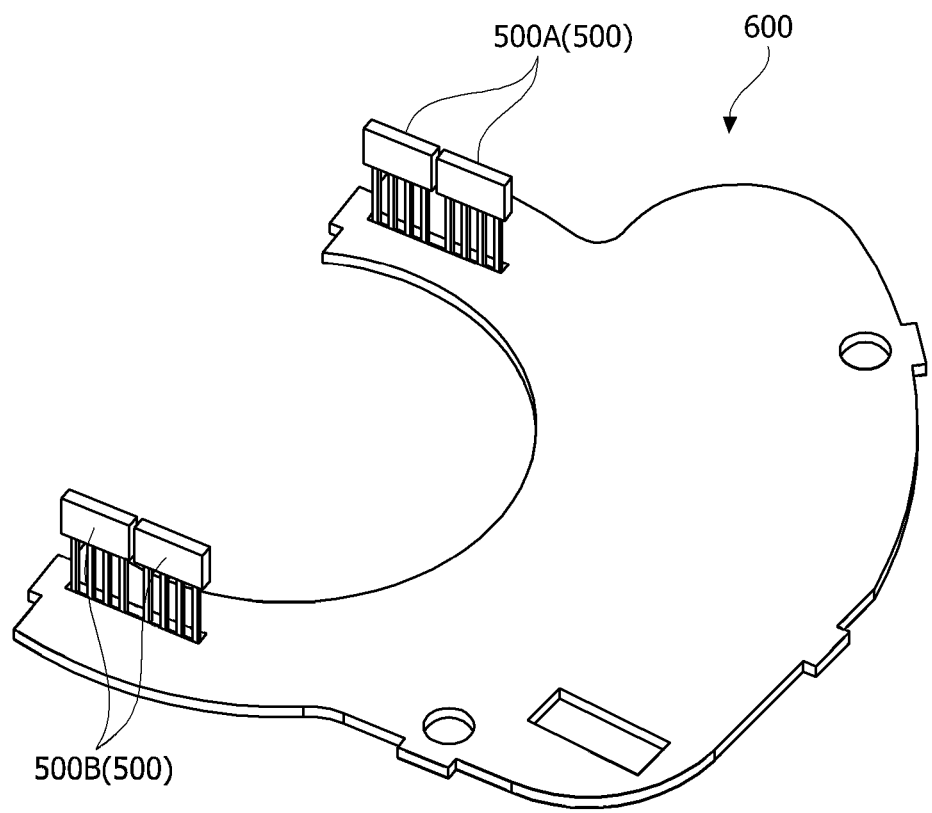
FIG. 32 is a view illustrating a circuit board.

FIG. 32 is a view illustrating the circuit board.

Referring to FIG. 32, the two sensors 500A and 500B may be disposed on the circuit board 600. The two sensors 500A and 500B are disposed on the circuit board 600 in an upwardly erect state.

Figure 33:
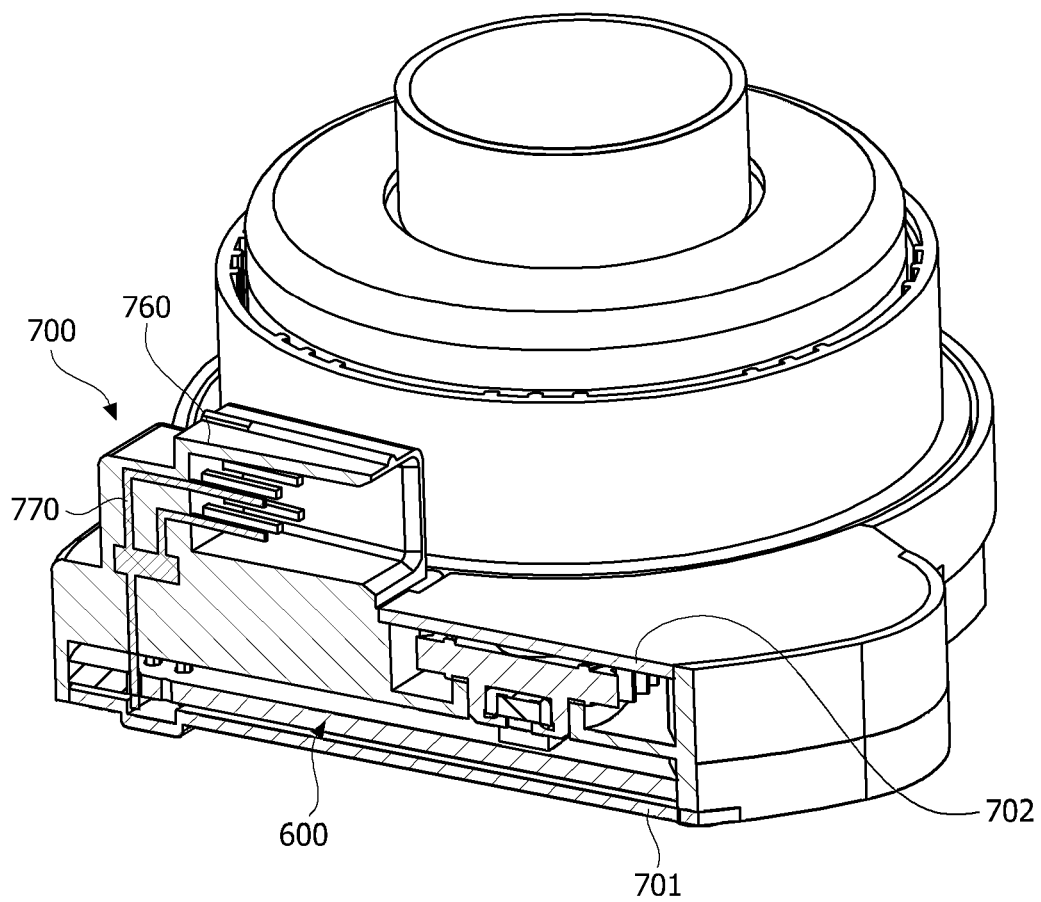
FIG. 33 is a cross-sectional view illustrating a connector housing and a pin of a housing.

FIG. 33 is a cross-sectional view illustrating a connector housing and a pin of a housing.

Referring to FIG. 33, the housing 700 includes a connector housing 760 and a pin 770. The pin 770 electrically connects the circuit board 600 and an external cable. One side of the pin 770 is connected to the circuit board 600 disposed on a lower side of the housing 700. The other side of the pin 770 is exposed at an inner side of the connector housing 760. An inlet of the connector housing 760 may be perpendicular to the axial direction. The pin 770 may have a shape bent in a "ㄱ" shape.

Figure 34:
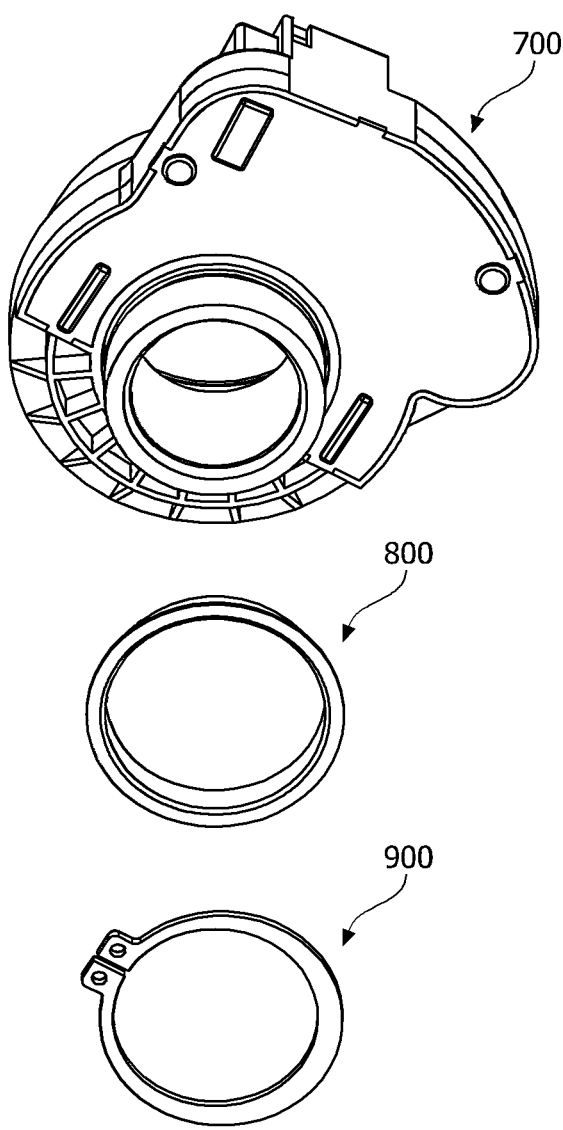
FIG. 34 is a view illustrating a first member and a second member.
Figure 35:
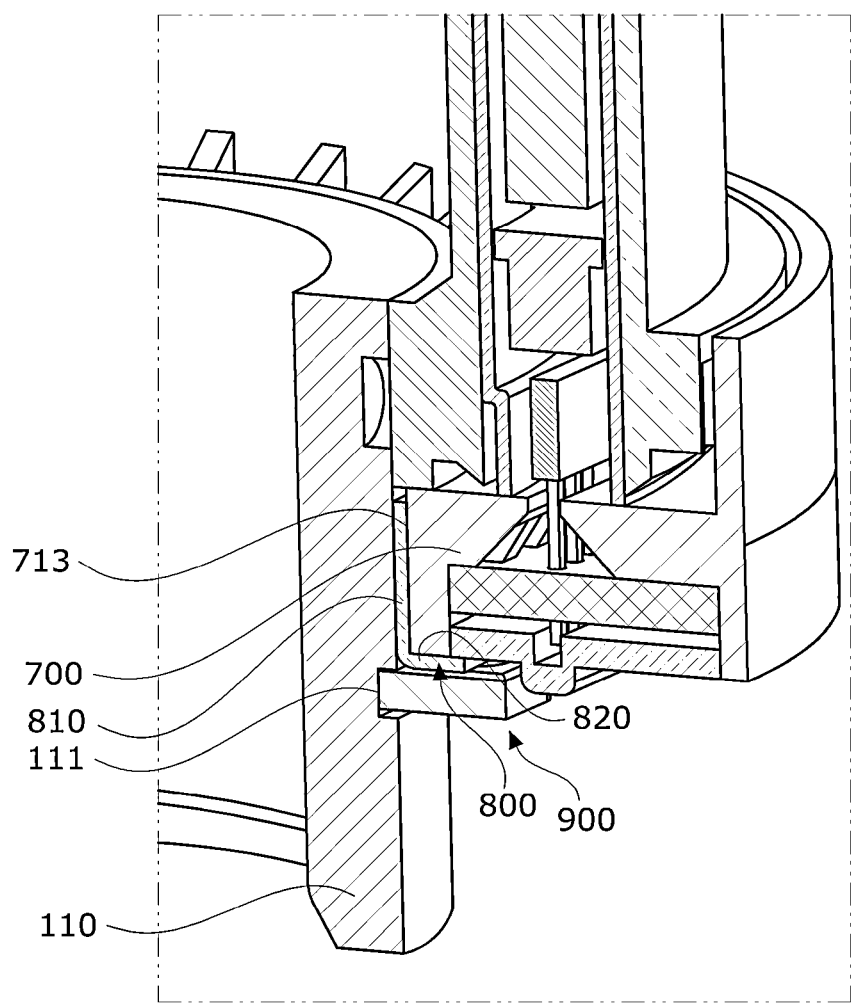
FIG. 35 is a view illustrating the first member and the second member installed on the stator holder.

FIG. 34 is a view illustrating the first member and the second member, and FIG. 35 is a view illustrating the first member and the second member installed on the stator holder.

Referring to FIGS. 34 and 35, the first member 800 is provided to inhibit an error in coaxial alignment of the sensing device due to abrasion of a sidewall of a hole 713 of a housing body 710. As described above, the first tooth 132 and the second tooth 142 are disposed to overlap each other in the radial direction. Further, in the radial direction, the sensor 500 is disposed between the first tooth 132 and the second tooth 142. Accordingly, when flow occurs in the radial direction, as a distance from the first tooth 132 and the second tooth 142 to the sensor 500 changes, fatal damage to the sensor device or performance problems may occur.

The first member 800 may be a ring-shaped member, and may include a body 810 and a flange portion 820. The body 810 is a cylindrical member. The body 810 may be disposed along an inner wall of the hole 713 of the housing body 710. The body 810 is located between the outer circumferential surface of the stator holder 110 and the inner wall of the hole 713 of the body 810. The flange portion 820 has a shape radially extending from a lower end of the body 810. The flange portion 820 is disposed to come into contact with a lower surface of the housing body 710. Further, the flange portion 820 may be disposed to cover a portion of a first cover 701. In addition, the first member 800 may be formed of a metal material.

A lower surface of the flange portion 820 may come into contact with an upper surface of the first member 800.

The first member 800 serves to physically isolates the hole 713 of the housing body 710 and the stator holder 110 as the stator holder 110 rotates to inhibit abrasion of the inner wall of the hole 713 of the housing body 710 as the stator holder 110 rotates. As a result, the first member 800 secures coaxial rotation of the stator holder 110.

With respect to the axial direction, the housing 700 is caught on the main gear 121a of the stator body 120 and is not separated to an upper side of the stator 200. However, the housing 700 may be separated to a lower side of the stator 200. The second member 900 serves to inhibit separation of the housing 900 to the lower side of the stator 200. The second member 900 may have a c-ring shape. The second member 900 may be formed of a metal material. The second member 900 may be formed of an elastically deformable material.

The second member 900 is coupled to the groove 111 of the stator holder 110. The groove 111 is concavely formed along the outer circumferential surface of the stator holder 110. The second member 900 is located under the lower surface of the housing body 710 in a state of being coupled to the stator holder 110. Further, the second member 900 may be disposed under the first member 800 to support the lower surface of the flange portion 820 of the first member 800.

Figure 36:
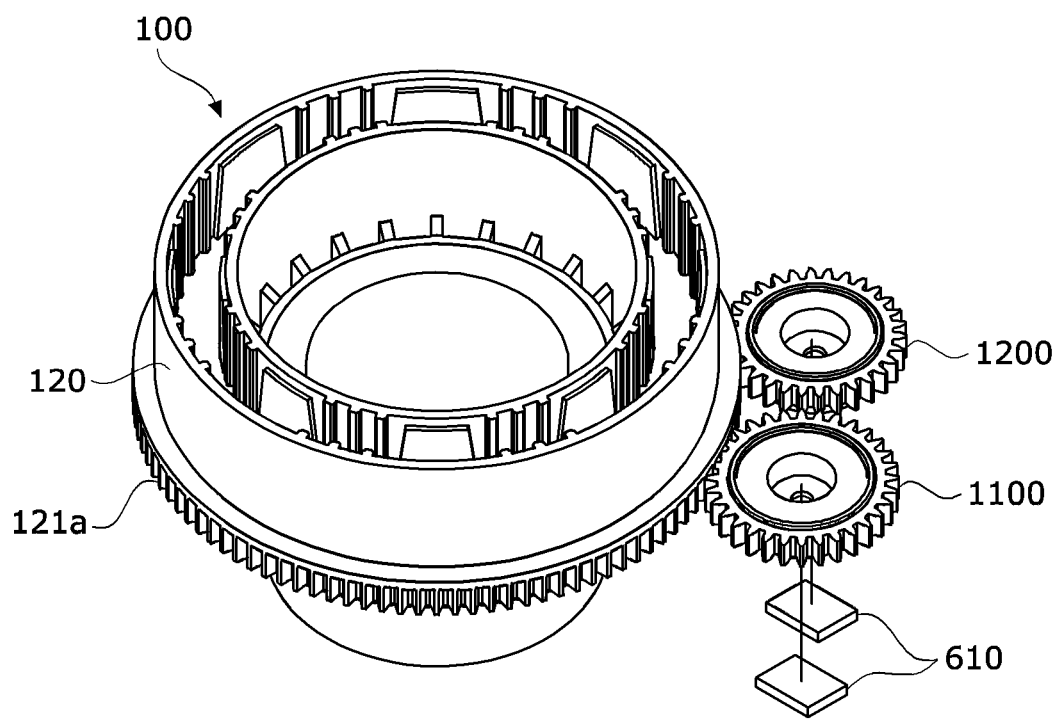
FIG. 36 is a view illustrating a first gear and a second gear engaged with a main gear.

FIG. 36 is a view illustrating the first gear and the second gear engaged with the main gear.

Referring to FIGS. 2 and 36, as a sub gear engaged with the main gear 121a, the first gear 1100 and the second gear 1200 are included. The main gear 121a, the first gear 1100, the second gear 1200, and a third sensor 610 are provided to measure an angle of the steering shaft.

The main gear 121a, the first gear 1100, and the second gear 1200 engage with each other and rotate. The main gear 121a is disposed on the outer circumferential surface of the stator body 120. The first gear 1100 and the second gear 1200 are rotatably disposed on the housing body 710. The main gear 121a, the first gear 1100, and the second gear 1200 each have a predetermined gear ratio. For example, in the case in which the total angle of the main gear 121a is 1620°, the first gear 1100 may be designed to rotate 15.6 rotations, and the second gear 1200 may be designed to rotate 14.625 rotations when the main gear 121a rotates 4.5 rotations. Here, a total angle is an angle calculated by accumulating the rotation of the main gear 121a when all gears return to a state immediately before rotation.

Magnets may be disposed on the first gear 1100 and the second gear 1200. The magnets are disposed to face the third sensor 610. The third sensor 610 is mounted on the circuit board.

Figure 37:
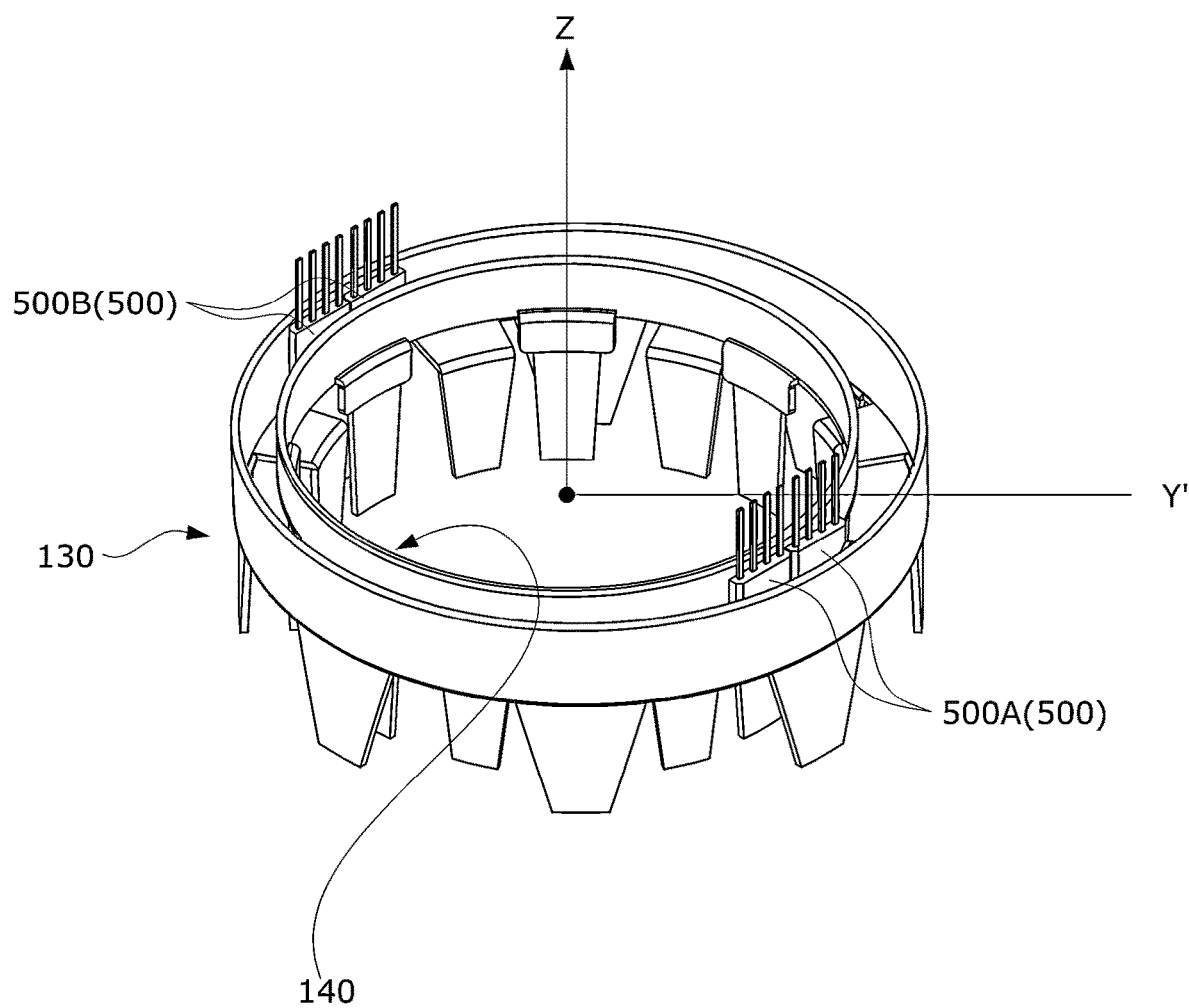
FIG. 37 is a view illustrating directivity of the external magnetic field with respect to the stator teeth.
Figure 38:
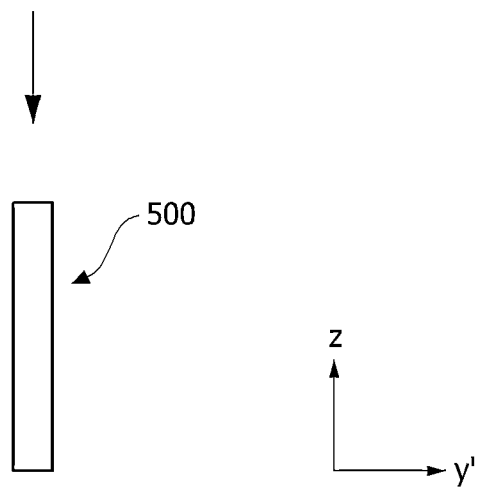
FIG. 38 is a view illustrating an avoidance state of a sensor with respect to an external magnetic field having z-axis directivity.
Figure 39:
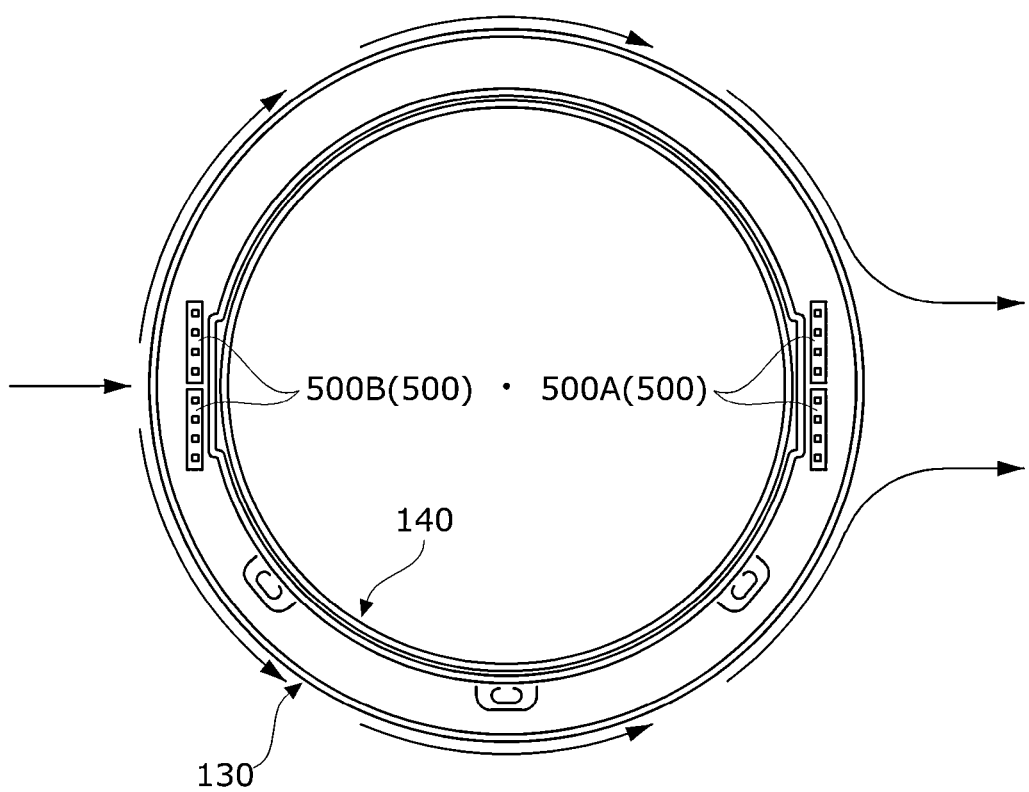
FIG. 39 is a view illustrating an avoidance state of the first and second stator teeth with respect to an external magnetic field having y-axis directivity.

FIG. 37 is a view illustrating directivity of the external magnetic field with respect to the stator teeth, FIG. 38 is a view illustrating an avoidance state of a sensor with respect an external magnetic field having z-axis directivity, and FIG. 39 is a view illustrating an avoidance state of the first and second stator teeth with respect to an external magnetic field having y'-axis directivity.

Referring to FIG. 37, the external magnetic field greatly affects the sensing device in a z-axis direction which is an axial direction and a y'-axis direction perpendicular to the z-axis direction. Here, the y'-axis direction indicates a direction toward the sensor 500 among radial directions perpendicular to the axial direction.

Referring to FIG. 38, the sensor 500 of the sensing device according to the embodiment is disposed in an erect state in the z-axis direction. Accordingly, an area of the sensor 500 viewed from the z-axis is much smaller than an area of the sensor 500 viewed from the y' axis. Accordingly, the sensing device according to the embodiment has an advantage in that the influence of the external magnetic field on the sensor 500 in the z-axis direction is small.

Referring to FIG. 39, an external magnetic field in the y'-axis direction may have a great effect on the sensor 500 when the erect state of the sensor 500 in the z-axis direction is viewed. However, the external magnetic field in the y'-axis direction is induced along the first stator tooth 130 and the second stator tooth 140, and thus flows without affecting the sensor 500. Accordingly, the sensing device according to the embodiment has an advantage in that the influence of the external magnetic field on the sensor 500 is small even when referring to the y'-axis direction.

Figure 40:
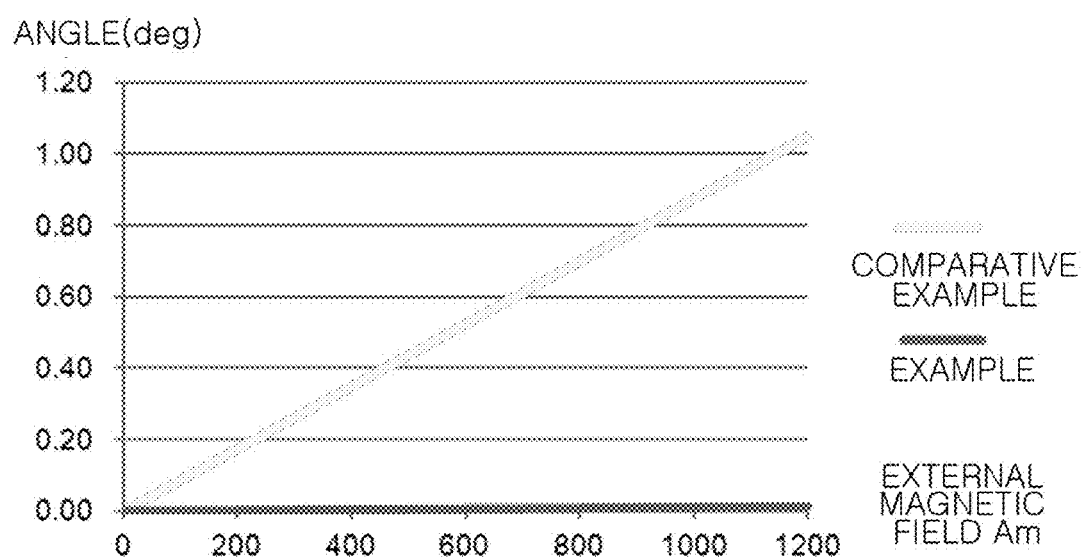
FIG. 40 is a graph in which Comparative Example and Example are compared with respect to an angle change amount corresponding to an external magnetic field in a z-axis direction.

FIG. 40 is a graph in which Comparative Example and Example are compared with respect to an angle change amount corresponding to the external magnetic field in the z-axis direction.

Referring to FIG. 40, in the case of Comparative Example, as a sensing device with a structure in which stator teeth are vertically disposed and a sensor is disposed to be laid down, it can be seen that an angle change linearly increases as an external magnetic field in the z-axis direction increases, and thus a measurement angle greatly changes according to the external magnetic field.

However, in Example, it can be seen that there is little change in the angle, and thus there is no effect by the external magnetic field even when the external magnetic field in the z-axis direction increases.

Figure 41:
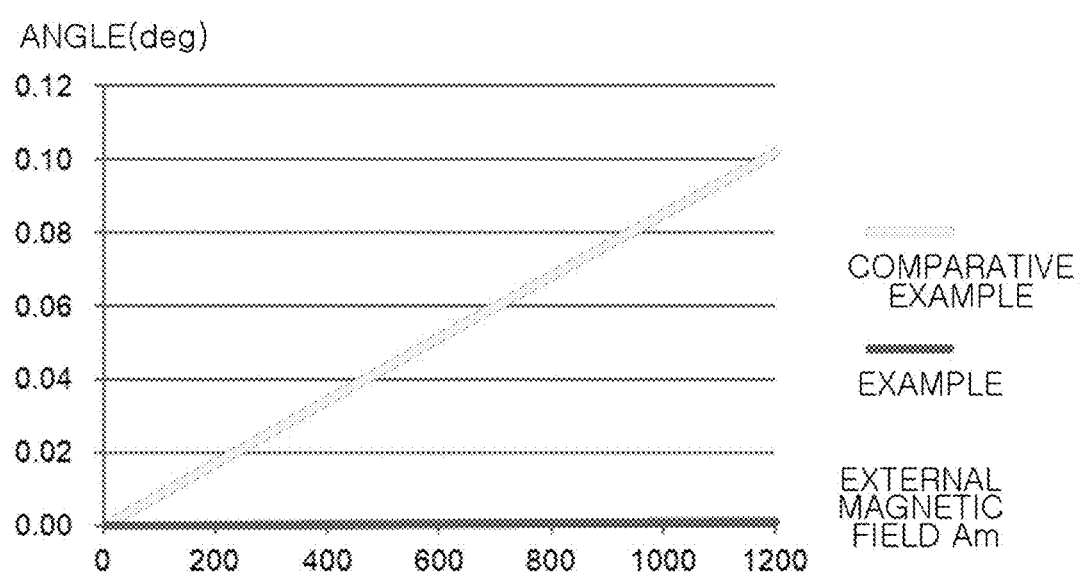
FIG. 41 is a graph in which Comparative Example and Example are compared with respect to an angle change amount corresponding to an external magnetic field in a y'-axis direction.

FIG. 41 is a graph in which Comparative Example and Example are compared with respect to an angle change amount corresponding to an external magnetic field in the y'-axis direction.

Referring to FIG. 41, in the case of Comparative Example, as a sensing device with a structure in which stator teeth are vertically disposed and a sensor is disposed to be laid down, it can be seen that an angle change linearly increases as an external magnetic field in the y'-axis direction increases, and thus a measurement angle greatly changes according to the external magnetic field.

However, in Example, it can be seen that there is little change in the angle, and thus there is no effect by the external magnetic field even when the external magnetic field in the y'-axis direction increases.

The invention claimed is:

1. A sensing device comprising:
   a stator; and
   a rotor including a magnet,
   wherein the stator includes a first stator tooth and a second stator tooth,
   wherein the first stator tooth includes a first body, a first tooth, and a third tooth,
   wherein the second stator tooth includes a second body and a second tooth,
   wherein the third tooth is connected to the first body,
   wherein an inner diameter of the second tooth is smaller than an inner diameter of the second body,
   wherein a distance between the first body and the second body is different from a distance between the first tooth and the second tooth in a radial direction.

2. The sensing device of claim 1, wherein:
   the stator includes a stator holder and a stator body coupled to the stator holder; and
   the first stator tooth and the second stator tooth are disposed in the stator body.

3. The sensing device of claim 2, wherein the stator body includes a first hole through which the first tooth passes, a second hole through which the second tooth passes, and a third hole through which the third tooth passes.

4. The sensing device of claim 1,
   wherein the second body includes a protruding portion configured to protrude toward the sensor,
   wherein a collector is disposed between the protruding portion and the sensor.

5. The sensing device of claim 1,
   wherein a width of a lower end of the third tooth in a circumferential direction is smaller than a width of a lower end of the first tooth in the circumferential direction.

6. A sensing device comprising:
a stator including stator teeth; and
a rotor including a magnet,
wherein the stator teeth include a first stator tooth and a second stator tooth disposed to overlap the first stator tooth in a radial direction from a center of the stator,
wherein the first stator tooth includes a plurality of first teeth and a plurality of third teeth,
wherein the second stator tooth includes a plurality of second teeth,
wherein the second teeth and the third teeth are disposed on a virtual first circumference; and
the first teeth are disposed on a virtual second circumference different from the virtual first circumference.

7. The sensing device of claim 6, wherein:
the magnet is disposed between the plurality of first teeth and the plurality of second teeth.

8. The sensing device of claim 7, wherein:
the magnet is disposed between the first teeth and the third teeth in the radial direction.

9. The sensing device of claim 6,
wherein the first teeth, the second teeth, and the third teeth are concentrically disposed.

10. The sensing device of claim 6, wherein the third teeth and the second teeth are alternately disposed along a circumferential direction of the stator.

\* \* \* \* \*